US011044522B2

(12) United States Patent
Smith et al.

(10) Patent No.: US 11,044,522 B2
(45) Date of Patent: *Jun. 22, 2021

(54) METHODS AND APPARATUS FOR AN EMBEDDED APPLIANCE

(71) Applicant: Echo360, Inc., Reston, VA (US)

(72) Inventors: John J. Smith, Manassas, VA (US); Stephen R. Titus, Herndon, VA (US); Douglas E. Rogers, Sterling, VA (US); David Henry Boyle, McLean, VA (US); Keira Kaitlyn Johnson, Clifton, VA (US); Jonathan D. Bell, Hamilton, VA (US)

(73) Assignee: Echo360, Inc., Dulles, VA (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/355,581

(22) Filed: Nov. 18, 2016

(65) Prior Publication Data

US 2017/0070780 A1 Mar. 9, 2017

Related U.S. Application Data

(63) Continuation of application No. 14/679,625, filed on Apr. 6, 2015, now Pat. No. 9,510,045, which is a (Continued)

(51) Int. Cl.
*G06F 15/16* (2006.01)
*H04N 21/4402* (2011.01)
(Continued)

(52) U.S. Cl.
CPC ..... *H04N 21/440218* (2013.01); *G09G 5/005* (2013.01); *G09G 5/008* (2013.01);
(Continued)

(58) Field of Classification Search
CPC .......................... H04N 21/42203; H04N 7/01
See application file for complete search history.

(56) References Cited

U.S. PATENT DOCUMENTS

| 5,544,315 | A | 8/1996 | Lehfeldt et al. |
| 5,734,843 | A | 3/1998 | Gephardt et al. |
| (Continued) | | | |

FOREIGN PATENT DOCUMENTS

| CN | 1585471 A | 2/2005 |
| CN | 2679930 Y | 2/2005 |
| (Continued) | | |

OTHER PUBLICATIONS

Examination Report for Canadian Application No. 2,914,803, dated Oct. 29, 2018.

(Continued)

*Primary Examiner* — Yves Dalencourt
(74) *Attorney, Agent, or Firm* — Cooley LLP

(57) ABSTRACT

In some embodiments, an apparatus comprises a media module and a modification module included in an embedded appliance. The media module is configured to receive a first media signal associated with a first input port of the embedded appliance and a second media signal associated with a second input port of the embedded appliance. The media module is configured to identify a first set of media signal parameters based on the first media signal. The modification module is configured to receive a modification instruction associated with a session format having a second set of media signal parameters different from the first set of media signal parameters. The modification module is configured to modify the first media signal based on the first set of media signal parameters and the modification instruction to produce a first modified media signal in the session format and having the second set of media signal parameters.

21 Claims, 9 Drawing Sheets

Related U.S. Application Data continuation of application No. 13/538,033, filed on Jun. 29, 2012, now Pat. No. 9,003,061.

(60) Provisional application No. 61/503,472, filed on Jun. 30, 2011.

(51) Int. Cl.

| | | |
|---|---|---|
| *H04N 7/01* | (2006.01) | |
| *H04N 9/804* | (2006.01) | |
| *H04N 9/82* | (2006.01) | |
| *H04N 21/4223* | (2011.01) | |
| *G09G 5/00* | (2006.01) | |
| *H04N 5/04* | (2006.01) | |
| *H04N 21/262* | (2011.01) | |
| *H04N 21/432* | (2011.01) | |
| *H04N 21/422* | (2011.01) | |
| *H04N 21/433* | (2011.01) | |
| *H04N 21/4788* | (2011.01) | |

(52) U.S. Cl.
CPC ............ *H04N 5/04* (2013.01); *H04N 7/01* (2013.01); *H04N 9/8042* (2013.01); *H04N 9/8205* (2013.01); *H04N 21/262* (2013.01); *H04N 21/4223* (2013.01); *H04N 21/432* (2013.01); *G09G 2340/02* (2013.01); *G09G 2340/0407* (2013.01); *G09G 2340/0435* (2013.01); *G09G 2340/06* (2013.01); *G09G 2370/042* (2013.01); *G09G 2370/12* (2013.01); *G09G 2370/22* (2013.01); *H04N 21/42203* (2013.01); *H04N 21/4334* (2013.01); *H04N 21/4402* (2013.01); *H04N 21/4788* (2013.01)

(56) References Cited

U.S. PATENT DOCUMENTS

| | | | |
|---|---|---|---|
| 5,745,711 | A | 4/1998 | Kitahara et al. |
| 6,067,624 | A | 5/2000 | Kuno |
| 6,104,430 | A | 8/2000 | Fukuoka |
| 6,177,950 | B1 | 1/2001 | Robb |
| 6,271,752 | B1 | 8/2001 | Vaios |
| 6,323,897 | B1 | 11/2001 | Kogane et al. |
| 6,473,846 | B1 | 10/2002 | Melchior |
| 6,564,380 | B1 | 5/2003 | Murphy |
| 6,628,325 | B1 | 9/2003 | Steinberg et al. |
| 6,653,609 | B2 | 11/2003 | Ozawa et al. |
| 6,698,021 | B1 | 2/2004 | Amini et al. |
| 6,789,228 | B1 | 9/2004 | Merril et al. |
| 6,803,945 | B1 | 10/2004 | Needham |
| 6,845,182 | B2 | 1/2005 | Matsuo |
| 6,876,668 | B1 | 4/2005 | Chawla et al. |
| 6,965,398 | B2 | 11/2005 | Arakt |
| 6,980,232 | B2 | 12/2005 | Suzuki |
| 7,075,568 | B2 | 7/2006 | Aizawa |
| 7,085,845 | B2 | 8/2006 | Woodward et al. |
| 7,099,309 | B2 | 8/2006 | Davidson |
| 7,149,973 | B2 | 12/2006 | Dias et al. |
| 7,154,538 | B1 | 12/2006 | Fukasawa et al. |
| 7,239,343 | B2 | 7/2007 | Ohsawa et al. |
| 7,272,845 | B2 | 9/2007 | Creamer et al. |
| 7,275,159 | B2 | 9/2007 | Hull et al. |
| 7,298,930 | B1 | 11/2007 | Erol et al. |
| 7,299,289 | B1 | 11/2007 | Lorenz et al. |
| 7,423,670 | B2 | 9/2008 | Kawai et al. |
| 7,425,987 | B2 | 9/2008 | Creamer et al. |
| 7,428,005 | B2 | 9/2008 | Creamer et al. |
| 7,446,801 | B2 | 11/2008 | Iizuka |
| 7,508,535 | B2 | 3/2009 | Hart et al. |
| 7,528,976 | B2 | 5/2009 | Hart et al. |
| 7,528,977 | B2 | 5/2009 | Hull et al. |
| 7,573,593 | B2 | 8/2009 | Hart et al. |
| 7,720,251 | B2 | 5/2010 | Allen et al. |
| 7,730,407 | B2 | 6/2010 | Chiu et al. |
| 7,954,130 | B2 | 5/2011 | Yanai |
| 7,983,160 | B2 | 7/2011 | Gunatilake |
| 8,068,637 | B2 | 11/2011 | Allen et al. |
| 8,220,045 | B2 | 7/2012 | Conti et al. |
| 8,503,716 | B2 | 8/2013 | Allen et al. |
| 9,071,746 | B2 | 6/2015 | Allen et al. |
| 9,819,973 | B2 | 11/2017 | Allen et al. |
| 2001/0015770 | A1 | 8/2001 | Vaughan et al. |
| 2001/0017655 | A1 | 8/2001 | Arakt |
| 2001/0017656 | A1 | 8/2001 | Araki et al. |
| 2001/0027493 | A1 | 10/2001 | Wallace |
| 2002/0161980 | A1 | 10/2002 | Nishikawa |
| 2003/0067543 | A1 | 4/2003 | Okada et al. |
| 2003/0108105 | A1 | 6/2003 | Morad et al. |
| 2003/0112335 | A1 | 6/2003 | Strandwitz et al. |
| 2003/0189649 | A1 | 10/2003 | Kuno |
| 2004/0051787 | A1 | 3/2004 | Mutsuro et al. |
| 2004/0056964 | A1 | 3/2004 | Kawai et al. |
| 2004/0117427 | A1 | 6/2004 | Allen et al. |
| 2004/0158582 | A1 | 8/2004 | Takagi et al. |
| 2004/0183896 | A1 | 9/2004 | Takainine et al. |
| 2004/0198426 | A1 | 10/2004 | Squibbs et al. |
| 2004/0225743 | A1 | 11/2004 | Huggins et al. |
| 2005/0034057 | A1 | 2/2005 | Hull et al. |
| 2005/0050577 | A1 | 3/2005 | Westbrook et al. |
| 2005/0054285 | A1 | 3/2005 | Mears et al. |
| 2005/0055483 | A1 | 3/2005 | Devlin et al. |
| 2005/0068571 | A1 | 3/2005 | Hart et al. |
| 2005/0068572 | A1 | 3/2005 | Hart et al. |
| 2005/0071519 | A1 | 3/2005 | Hart et al. |
| 2005/0071520 | A1 | 3/2005 | Hull et al. |
| 2005/0071746 | A1 | 3/2005 | Hart et al. |
| 2005/0177624 | A1 | 8/2005 | Oswald et al. |
| 2005/0253851 | A1 | 11/2005 | Tsukamoto |
| 2006/0033838 | A1 | 2/2006 | Choi |
| 2006/0070105 | A1 | 3/2006 | Kawai |
| 2006/0136803 | A1 | 6/2006 | Erol et al. |
| 2006/0161960 | A1 | 7/2006 | Benoit |
| 2006/0230123 | A1 | 10/2006 | Simmons et al. |
| 2006/0253894 | A1 | 11/2006 | Bookman et al. |
| 2007/0065032 | A1 | 3/2007 | Hernandez et al. |
| 2008/0013460 | A1 | 1/2008 | Allen et al. |
| 2008/0034400 | A1 | 2/2008 | Allen et al. |
| 2008/0100742 | A1 | 5/2008 | Mogre et al. |
| 2008/0120676 | A1 | 5/2008 | Morad et al. |
| 2008/0129870 | A1 | 6/2008 | Champion et al. |
| 2009/0147840 | A1* | 6/2009 | Sahdra ............... H04N 5/76 375/240.01 |
| 2010/0118115 | A1* | 5/2010 | Takahashi .......... H04N 1/00291 348/24 |
| 2010/0177017 | A1 | 7/2010 | Zeng et al. |
| 2010/0253840 | A1 | 10/2010 | Nave |
| 2012/0069207 | A1 | 3/2012 | Allen et al. |
| 2015/0304690 | A1 | 10/2015 | Allen et al. |

FOREIGN PATENT DOCUMENTS

| | | |
|---|---|---|
| CN | 1755747 A | 4/2006 |
| JP | 08-331264 | 12/1996 |
| JP | 2002-135741 | 5/2002 |
| JP | 2002-140203 | 5/2002 |
| JP | 2002-271768 | 9/2002 |
| JP | 2004-187318 | 7/2004 |
| JP | 2004-259263 | 9/2004 |
| JP | 2004-266831 | 9/2004 |
| JP | 2005-109922 | 4/2005 |
| JP | 2006-033743 | 2/2006 |
| JP | 2006-040282 | 2/2006 |
| TW | 1242126 | 10/2005 |
| WO | WO 01/27763 A1 | 4/2001 |
| WO | WO 2007/150019 | 12/2007 |

OTHER PUBLICATIONS

Examination Report for Canadian Application No. 2,840,579, dated Nov. 26, 2018.

(56) References Cited

OTHER PUBLICATIONS

Patent Examination Report No. 1 for Australian Application No. 2016225817, dated Jul. 2, 2018.
Patent Examination Report No. 1 for Australian Application No. 2017200865, dated Jan. 3, 2019.
Office Action for U.S. Appl. No. 14/754,144, dated Dec. 14, 2016.
Examination Report for Canadian Application No. 2,914,803, dated Dec. 22, 2016.
Patent Examination Report No. 3 for Australian Application No. 2012275251, dated Jan. 19, 2017.
Second Office Action for Chinese Application No. 201280038032.X, dated Jul. 10, 2017.
Office Action for European Application No. 12804521.8, dated Sep. 7, 2017.
Partridge, Kurt et al. , "Facile: a framework for attention-correlated local communication" In Mobile Computing Systems and Applications, 2003. Proceedings, Fifth IEEE Workshop, Publication Date Oct. 9-10, 2003, pp. 139-147 Posted online: Oct. 27, 2003 09:54:30.0. [retrieved on Nov. 29, 2007]. Retrieved from the Internet: <URL: http://www.lit.edu/~newmsar/facile.pdf, 9 pages.
Citation showing publication date for Partridge, Kurt et al. , "Facile: a framework for attention-correlated local communication" In Mobile Computing Systems and Applications, 2003. Proceedings, Fifth IEEE Workshop, Publication Date Oct. 9-10, 2003, pp. 139-147 Posted online: Oct. 27, 2003 09:54:30.0. [retrieved on Nov. 29, 2007]. Retrieved from the Internet: <URL: http://ieeexplore.ieee.org/xpl/absprintf.jsp?arnumber=1240775&page=FREE>, 1 page.
Rowe, Lawrence A., "Webcast and Distributed Collaboration Control Automation," Research Proposal Submitted to NSF (Feb. 1, 2001), Webcast/Collaboration Control Automation Proposal, 16 pages.
Dimitrova, Nevenka et al., "Applications of Video-Content Analysis and Retrieval," IEEE MultiMedia, 1070-086X/02, Jul.-Sep. 2002, pp. 42-55.
Rowe, Lawrence A., "Distributed Streaming Media Application Middleware," Research Proposal Submitted to NSF Middleware Program (Mar. 2002), 18 pages.
Dr. Bill Hancock, "Security Views" Computers & Security, Elsevier Science Publishers, vol. 18, No. 6, ISSN: 0167-4048, 1999, pp. 458-470.
Xin Feng et al., "Integrating Embedded PC and Internet Technologies for Real-Time Control and Imaging" IEEE/ASME Transactions on Mechatronics, vol. 7, No. 1, ISSN: 1083-4435, Mar. 2002, pp. 52-60.
Ming Li et al., "Embedded Video Surveillance System for Vehicle over WLAN and CDMAIX" IEEE vol. 2, ISBN: 978-0-7803-9335-6, 2005, pp. 1292-1295.
Frank Stajano et al., "The Resurrecting Duckling: Security Issues for Ad-hoc Wireless Networks" Security Protocols Lecture Notes in Computer Science, ISBN: 978-3-540-67381-1, 2000, pp. 172-182.
Texas Instruments, "TMS320DM320 CPU and Peripherals vol. 1," 2003, [Online] Retrieved from the Internet: <URL: http://www.heyrick.co.uk/blog/files/datasheets/tms320dm320part1.pdf>, 2003, 8 pgs.
Cvt Standard: "VESA Coordinated Video Timings Standard Coordinated Video Timings Standard," Retrieved from the Internet: <URL: ftp://ftp.cis.nctu.edu.tw/pub/csie/Software/X11/private/VeSaSpEcS/VESA_Document_Center_Monitor_Interface/CVTv1_1.pdf>, Sep. 10, 2003, 21 pages.
Office Action for U.S. Appl. No. 11/472.997, dated Nov. 18, 2008.
Final Office Action for U.S. Appl. No. 11/472,997, dated Aug. 13, 2009.
Office Action for U.S. Appl. No. 12/781,434, dated Mar. 3, 2011.
Office Action for U.S. Appl. No. 13/305,180, dated Jan. 24, 2012.
Final Office Action for U.S. Appl. No. 13/305,180, dated Aug. 2, 2012.
Patent Examination Report No. 2 for Australian Application No. 2013254937, dated Feb. 18, 2016.
Examination Report for Canadian Application No. 2,656,826, dated Jan. 17, 2014.
Examination Report for Canadian Application No. 2,656,826, dated Aug. 20, 2014.
Office Action for Chinese Application No. 200780030452.2, dated Feb. 18, 2011.
Office Action for Chinese Application No. 200780030452.2, dated Mar. 29, 2012.
Office Action for Chinese Application No. 200780030452.2, dated Nov. 5, 2012.
Office Action for Chinese Application No. 201310271947.1, dated May 29, 2015.
Second Office Action for Chinese Application No. 201310271947.1, dated Jan. 14, 2016.
Extended Search Report for European Application No. 07812250.4, dated Sep. 20, 2012.
Examination Report for European Application No. 07812250.4, dated May 27, 2013.
Summons to attend oral proceedings for European Application No. 07812250.4, dated Mar. 13, 2014.
Office Action for Japanese Application No. 2019-516745, dated Jul. 4, 2012.
Office Action for Japanese Application No. 2009-516745, dated Feb. 1, 2013.
Decision of Rejection for Japanese Application No. 2009-516745, dated Aug. 16, 2013.
Office Action for Mexican Application No. MX/a/2012/005964 dated Aug. 1, 2012.
English-language summary for Office Action for Mexican Application No. MX/a/2012/005964 dated Aug. 1, 2012.
Office Action for Mexican Application No. MX/a/2012/005964 dated Jan. 29, 2013.
Office Action for Taiwan Application No. 096122607, dated Jan. 14, 2013.
Office Action for Taiwan Application No. 096122607, dated Mar. 3, 2014.
Office Action for Taiwan Application No. 096122607, dated Jul. 16, 2014.
First Examination Report for New Zealand Application No. 619460, dated May 22, 2014.
Partial Supplementary Search Report for European Application No. 12804521.8, dated Mar. 12, 2015.
Extended Search Report for European Application No. 12804521.8, dated Jul. 3, 2015.
Patent Examination Report No. 1 for Australian Application No. 2012275251, dated Feb. 12, 2016.
Office Action for Chinese Application No. 201280038032.X, dated Sep. 26, 2016.
International Search Report and Written Opinion for International Application No. PCT/US07/71872, dated Sep. 15, 2008.
International Search Report and Written Opinion for International Application No. PCT/US2012/044879, dated Sep. 17, 2012.
Office Action for U.S. Appl. No. 14/754,144, dated Jun. 29, 2016.
Patent Examination Report No. 2 for Australian Application No. 2012275251, dated Nov. 3, 2015.
Office Action for Chinese Application No. 201610918491.7, dated Jan. 3, 2019.
Communication pursuant to Article 94(3) EPC for EP Application No. 12804521.8 dated Feb. 11, 2019.
Patent Examination Report No. 2 for Australian Application No. 2016225817, dated Jun. 18, 2019.
Extended European Search Report for European Application No. 19206075.4, dated Aug. 14, 2020.

* cited by examiner

METHODS AND APPARATUS FOR AN EMBEDDED APPLIANCE

CROSS-REFERENCE TO RELATED APPLICATIONS

This application is a continuation of U.S. patent application Ser. No. 14/679,625, entitled "METHODS AND APPARATUS FOR AN EMBEDDED APPLIANCE," filed Apr. 6, 2015 (now U.S. Pat. No. 9,510,045), which is a continuation of U.S. patent application Ser. No. 13/538,033, entitled "METHODS AND APPARATUS FOR AN EMBEDDED APPLIANCE," filed Jun. 29, 2012 (now U.S. Pat. No. 9,003,061), which claims priority to U.S. Provisional Application No. 61/503,472 filed Jun. 30, 2011, and entitled "METHODS AND APPARATUS FOR AN EMBEDDED APPLIANCE," the disclosures of which are hereby incorporated herein by reference in their entireties.

BACKGROUND

Some embodiments relate generally to an apparatus and method for an embedded appliance.

The ability to capture live media recordings of, for example, classroom instruction and meetings for on-demand availability and time-shifted viewing has become valuable to institutions such as universities and businesses. Although some commercial solutions for capturing and publishing live recordings are known, these solutions are often implemented on general purpose devices such as a personal computer (PC). Because these PC-based capture solutions use general purpose components and software, they are expensive, difficult to maintain, inefficient when capturing and storing signals, vulnerable to security threats, require special technical support and can be difficult to integrate into, for example, a smart classroom environment. Thus, a need exists for a purpose-built multimedia capture device.

SUMMARY

In some embodiments, an apparatus comprises a media module and a modification module included in an embedded appliance. The media module is configured to receive a first media signal associated with a first input port of the embedded appliance and a second media signal associated with a second input port of the embedded appliance. The media module is configured to identify a first set of media signal parameters based on the first media signal. The modification module is configured to receive a modification instruction associated with a session format having a second set of media signal parameters different from the first set of media signal parameters. The modification module is configured to modify the first media signal based on the first set of media signal parameters and the modification instruction to produce a first modified media signal in the session format and having the second set of media signal parameters.

DETAILED DESCRIPTION

Figure 1:
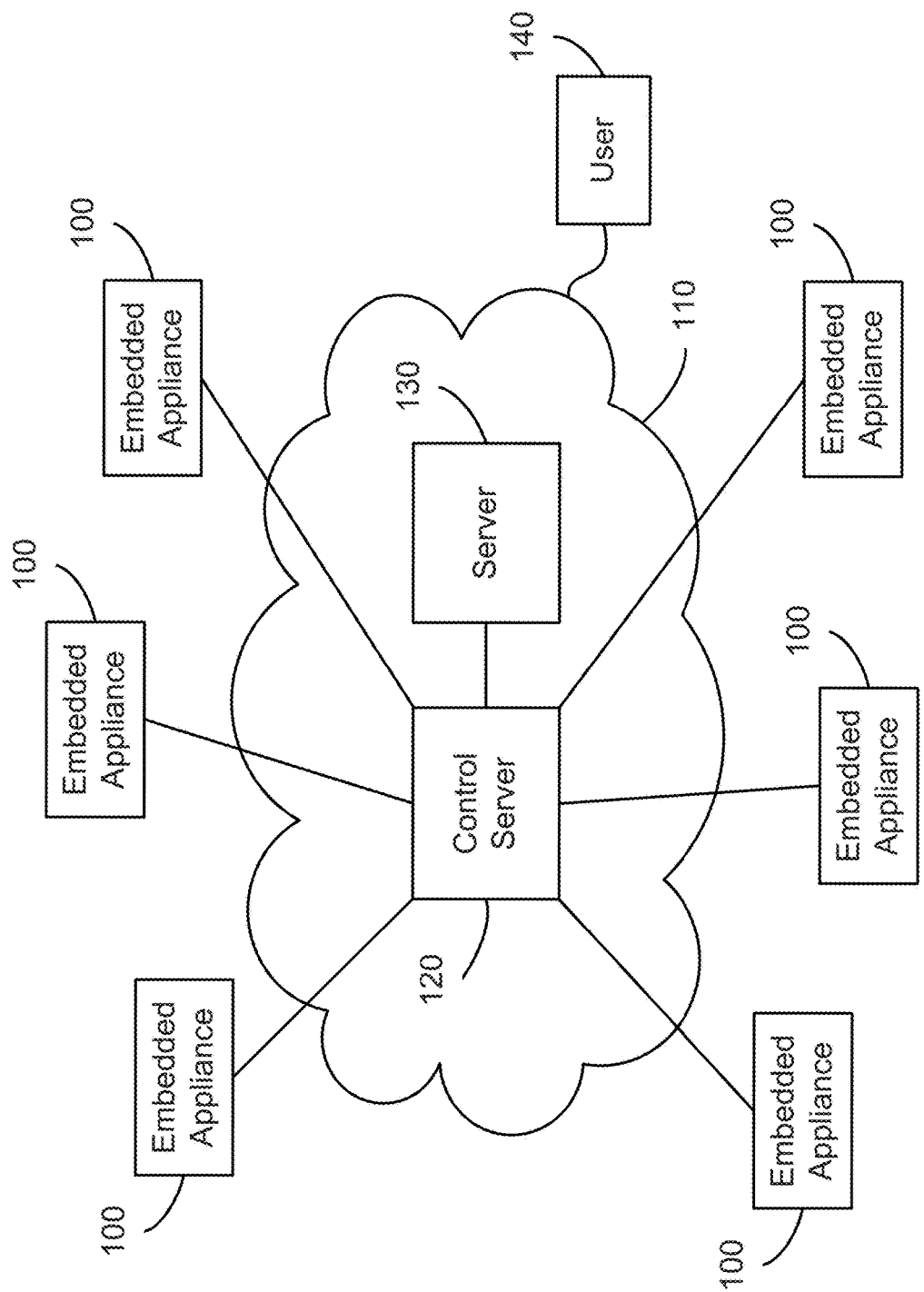
FIG. 1 is a system block diagram that illustrates embedded appliances coupled to a control server over a network, according to an embodiment.

An embedded appliance for multimedia capture (also referred to herein as an "embedded appliance") is a device dedicated to capturing, processing, storing and/or sending real-time media signals (e.g. audio signal, video signal, visual-capture signal, digital-image signal). The embedded appliance can capture real-time media signal(s) that can include digital-image signals, visual-capture signals, audio signals and/or video signals of, for example, an in-progress classroom presentation. As the media signal(s) are being captured, the embedded appliance can process and/or otherwise modify the signal(s) in real-time by, for example, compressing, indexing, encoding, decoding, synchronizing and/or formatting, for example, deinterleaving, decimating, scaling, modifying gain, modifying audio levels, and/or audio multiplexing, the content. Embedded appliances can be, for example, distributed throughout a network and coordinated according to a schedule to capture, process, store and send the real-time media signals for eventual retrieval by a user from, for example, a control server and/or a server(s) configured as, for example, a course management system. Media streams being captured on the embedded appliance optionally can also be monitored and/or further processed by a control server before distribution.

As a dedicated (i.e., specific-purpose) device having an embedded environment, the embedded appliance uses a hardened operating system (OS) and a processor (e.g., processor system) to capture, process, store and/or send real-time media signals. The hardened OS is configured to resist security attacks (e.g., prevent access by an unauthorized user or program) and facilitate functions related only to the capturing, processing, storing and/or sending of real-time media signals. In other words, the hardware and software within the embedded appliance are integrated into and designed specifically for capturing, processing, storing and/or sending real-time media signals. Because the hardware and software for capturing, processing, storing and/or sending real-time media signals are integrated into the embedded environment of the embedded appliance, the costs and complexity associated with installation, scaling, design, deployment and technical support can be lower than that for a general purpose system.

A real-time media signal represents an image and/or a sound of an event that is being acquired by a sensor at substantially the same time as the event is occurring and that is transmitted without a perceivable delay between the sensor when acquired and an embedded appliance. The capturing, processing, storing and/or sending of the real-time media signals by the embedded appliance can be performed at any time. Throughout the specification, real-time media signals are also referred to as media signals.

In some embodiments, an embedded appliance can include a media module and a modification module. The media module can be configured to receive a first media signal from a first input port of the embedded appliance and a second media signal from a second input port of the embedded appliance. The first media signal and the second media signal can be, for example, an audio signal received at an audio input port of the embedded appliance, a visual-capture media signal received at a visual-capture input port of the embedded appliance, a video media signal received at a video input port of the embedded appliance, or a digital-image media signal received at a digital-image input port of the embedded appliance.

The media module can be configured to identify a first set of media signal parameters based on the first media signal. The first set of media signal parameters can include, for example, a resolution of the first media signal, a frame rate of the first media signal, a bit rate of the first media signal, or a clock rate of the first media signal.

The modification module can be configured to receive a modification instruction associated with a session format having a second set of media signal parameters different from the first set of media signal parameters. In some embodiments, the session format is one from a set of predefined session formats, where each predefined session format from the set of predefined session formats is associated with a predefined set of media signal parameters from a group of predefined sets of media signal parameters. In such embodiments, the media module can be configured to identify the first set of media signal parameters from the group of predefined sets of media signal parameters. In some embodiments, the session format can be selected from the set of predefined session formats based on, for example, the first set of media signal parameters, a user-selected output parameter, or a capability of the embedded appliance.

Furthermore, the modification module can be configured to modify the first media signal based on the first set of media signal parameters and the modification instruction to produce a first modified media signal in the session format and having the second set of media signal parameters. In some embodiments, the modification module can be configured to modify the first media signal by performing on the first media signal, for example, deinterleaving, decimating, resizing, color space converting, modifying gain, adjusting audio level, or audio multiplexing.

As used in this specification, the singular forms "a," "an" and "the" include plural referents unless the context clearly dictates otherwise. Thus, for example, the term "an audio input port" is intended to mean a single audio input port or a combination of audio input ports.

FIG. 1 is a block diagram that illustrates embedded appliances 100 distributed across a network 110 and connected to a control server 120. The control server 120, in this embodiment, is connected with a server 130 that is configured, for example, as a course management system (e.g., a server running Blackboard™ WebCT, and/or Moodle). The network 110 can be any type of network including a local area network (LAN) or wide area network (WAN) implemented as a wired or wireless network in a variety of environments such as, for example, an office complex or a university campus. The embedded appliances 100 can capture real-time media signals including audio signals, visual-capture signals, digital-image signals and/or video signals acquired through electronic capture devices or sensors such as microphones, web cameras, video cameras, still cameras and video players. The embedded appliances 100 can also be configured to process, store and/or send (e.g., streaming the signal over a network using a real-time protocol, such as RTP) captured real-time media signals. Data associated with the content captured by real-time media signals can also be processed, stored, and/or sent; such data can include, for example, capture time, capture location, and/or speaker's name.

The embedded appliances 100 can be prompted to start and stop capturing real-time media signals in response to start and stop indicators generated by, for example, the control server 120 or the embedded appliances 100. The start and stop indicators can be generated according to a schedule determined and/or stored by the control server 120 and/or each embedded appliance 100. If implemented in, for example, a university campus environment, embedded appliances 100 can be fixed in university classrooms and connected via a university communications network. An embedded appliance 100 can be prompted, for example, according to a schedule stored on the embedded appliance 100 to capture media signals from a particular university classroom at a specific time.

In some embodiments, media signals captured by each embedded appliance 100 can be processed, stored and sent to the control server 120. The control server 120 receives the media signals and sends them to the server 130 where the content of the media signals are made available for distribution. In other embodiments, although not shown in FIG. 1, the embedded appliances 100 can be coupled to the server 130, and media signals captured by each embedded appliance 100 can be processed, stored and sent to the server 130 without going through the control server 120. The content of the media signals are then made available for distribution at the server 130.

In some embodiments, the content of the media signals can be made available for distribution to a user 140 at the control server 120 or the server 130. In some embodiments the content of the media signals can be made available for distribution to a user substantially immediately, e.g., real-time, can be stored for distribution at a time other than real-time, and/or can be simultaneously provided to a user in real-time and stored for distribution at a later time. In some embodiments, further processing of the media signals can be performed on the control server 120, the server 130 and/or another processing device (not shown in FIG. 1) before the content of the media signals is made available for distribution. The embedded appliances 100, the control server 120 and/or the server 130 can process the media signals by, for example, compressing, indexing, encoding, decoding, synchronizing and/or formatting, for example, deinterleaving, decimating, scaling, modifying gain, modifying audio levels, and/or audio multiplexing, the media signals.

The embedded appliances 100 can be prompted to start and stop sending processed real-time media signals in response to start and/or stop indicators generated by, for example, the control server 120 or the embedded appliance 100. The start and/or stop indicators can be generated according to a schedule or according to defined conditions. In some embodiments, the start and/or stop indicator can be a trigger signal generated by a trigger generator within a control server and received by a trigger receiver within an embedded appliance. More details regarding trigger signals in the context of video signal capturing are set forth in U.S. patent application Ser. No. 10/076,872, Publication No. US 2002/0175991 A1, "GPI Trigger Over TCP/IP for Video Acquisition," which is incorporated herein by reference.

The embedded appliances 100 can also be configured to send media signals after any stage of processing. For example, an embedded appliance 100 can be configured to send media signals to the control server 120, based on network traffic conditions, unsynchronized and unformatted portions of audio and digital-images signals after the signals have been encoded. The control server 120 can be configured to synchronize and format the audio and digital-image signals received from the embedded appliance 100.

The capturing of media signals on the embedded appliance 100 can also be monitored by the control server 120 through, for example, a confidence monitoring signal. Examples of confidence monitoring are described in U.S. Pat. No. 7,720,251, entitled "Embedded Appliance for Multimedia Capture," which is herein incorporated by reference in its entirety (the '251 patent).

Although FIG. 1 only shows a single control server 120 connected with multiple embedded appliances 100 in some embodiments, in other embodiments, more than one control server 120 can be connected with any combination of embedded appliances 100. For example, two control servers 120 can be configured to coordinate the capturing, processing, storing and/or sending of media signals captured by embedded appliances 100. The embedded appliances 100 can be programmed to recognize multiple control servers 120 and can be programmed to, for example, send a portion of a processed media signal to one of the control servers 120.

More specifically, as discussed further below, a given control server (e.g., control server 120) can be configured to generate and send instructions (e.g., modification instructions, requirements on desired output media signals) to the embedded appliance 100, such that modules in the embedded appliance 100 can perform signal detection, modification, encoding, and/or the like, based on the instructions. A separate storage server can be configured to receive output media signals from the embedded appliance 100, process the output media signals to make them available for users, and/or distribute the output media signals to other devices and users.

The control server that generates and sends instructions to the embedded appliance can receive user input that specifies the desired output media signals such as desired characteristics and/or parameters for the output media signals. Such user input can be received before the particular format of the input media devices at the embedded appliance is known or before the media signals are received at the embedded appliance. The control server can send the instructions based on the user input to the embedded appliance so that the requirements on the desired output media signal can be generated within the embedded appliance based on the instructions, as described below in connection with FIG. 2. Alternatively, in other embodiments, the requirements on the desired output media signal can be received at the embedded appliance 200 from an external resource such as, for example, a user (e.g., via a direct control signal) and/or any other type of external device that controls the embedded appliance.

Figure 2:
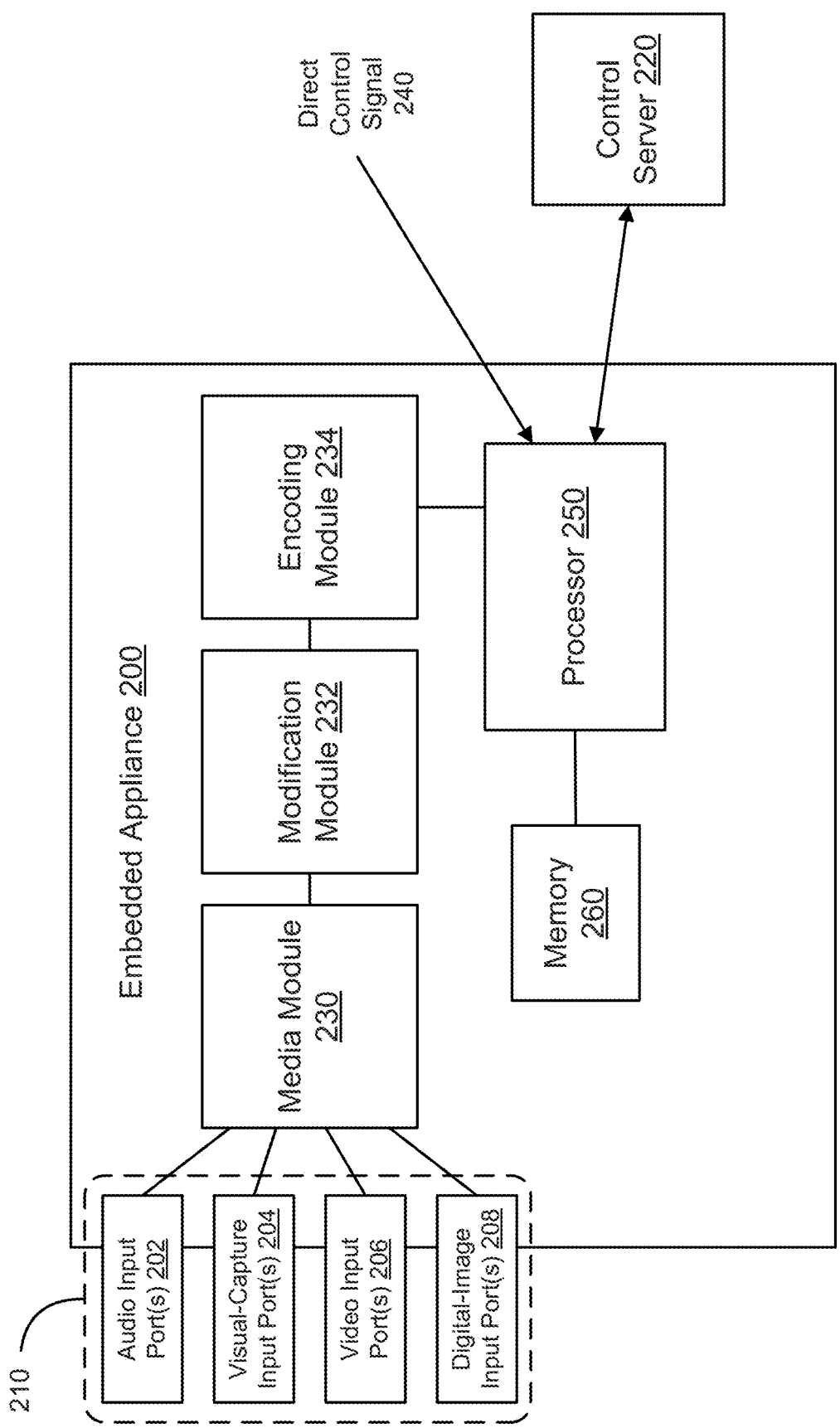
FIG. 2 is a system block diagram that illustrates an embedded appliance having input ports, a processor, a memory and multiple modules, according to an embodiment.

FIG. 2 is a system block diagram that illustrates an embedded appliance 200 with input ports 210, a media module 230, a modification module 232, an encoding module 234, a processor 250, and a memory 260. The embedded appliance 200 can be structurally and functionally similar to the embedded appliances 100 shown and described with respect to FIG. 1. While FIG. 2 depicts the processor 250 coupled to the media module 230 and the modification module 232 via the encoding module 234, in some embodiments, the processor 250 can be directly coupled to the media module 230 and/or the modification module 232. In such embodiments, the processor 250 can send instructions and/or control signals directly to the media module 230 and/or the modification module 232, via, for example, a bus (not shown in FIG. 2).

The embedded appliance 200 captures real-time media signals from various electronic devices via the input ports 210 in response to start and stop indicators generated by, for example, a scheduler (not shown in FIG. 2) in the embedded appliance 200, a scheduler in the control server 220, and/or from a direct control signal 240 from a user via a user interface (not shown in FIG. 2) of the embedded appliance 200. In some embodiment, the embedded appliance 200 can include an alarm module (not shown in FIG. 2). Examples of schedulers and alarm modules are described in the '251 patent.

The embedded appliance 200 receives and processes and/or modifies the media signals using the media module 230, the modification module 232, and/or the encoding module 234. Said another way, the embedded appliance 200 can receive a raw (or native) media signal(s), and send and/or store a processed and/or modified media signal ("encoded media signal"). The embedded appliance 200 can use the memory 260 to perform any of the above described functions such as storing encoded media signals. The embedded appliance 200 captures and transmits encoded media signals to the control server 220 when prompted by, for example, a scheduler and/or a user. The captured encoded media signals can be sent to the control server 220 as, for example, a multiplexed signal over a network connection via an output port (not shown) of the embedded appliance 200.

The input ports 210 include an audio input port(s) 202, a visual-capture input port(s) 204, a video input port(s) 206 and a digital-image input port(s) 208. Each of the input ports 210 is integrated as part of the embedded environment of the embedded appliance 200. The media signals captured by the inputs ports 210 can be received as analog signals and/or as digital signals. In some embodiments, a portion of the media signals can be analog, and a portion of the media signals can be digital.

The audio input port(s) 202 is used to capture an audio signal. The audio input port(s) 202 can be, for example, an RCA (Radio Corporation of America) stereo audio input port(s), a ¼" jack stereo audio input port(s), an XLR (Cannon X Series, Latch, Rubber) input port(s), a balanced wire block, a HDMI (High Definition Multimedia) input port(s) and/or a USB (Universal Serial Bus) port(s). The audio signal can be produced by any type of device capable of producing an audio signal, for example, a standalone microphone or microphone connected to a video camera. The embedded appliance 200 can include more or fewer audio input ports, and/or can include more than one audio input port format, for example, one RCA audio input port and one wire block audio input port.

The visual-capture input port(s) 204 receives a digital or analog VGA signal through, for example, a VGA input port(s), DVI (Digital Visual Interface) input port(s), XGA (Extended Graphics Array) input port(s), HD (High Definition)-15 input port(s), HDMI input port(s) and/or BNC (Bayonet Neill-Concelman) connector port(s). The visual-capture input port 204 captures images produced by, for example, a computer or a microscope. An electronic device connected to the visual-capture input port 204 can also be used to capture images from, for example, an electronic whiteboard transmitting images via, for example, a VGA signal. The embedded appliance 200 can include more or fewer visual-capture input ports, and/or can include more than one visual-capture input port format, for example, one VGA visual-capture input port and one DVI visual-capture input port.

The video input port(s) 206 receives motion video signals from devices such as video cameras via an input port(s) that includes, but is not limited to, an s-video input port(s), composite video input port(s), HDMI input port(s) and/or component video input port(s). The embedded appliance 200 can include more or fewer video input ports, and/or can include more than one video input port format, for example, one HDMI video input port and one composite video input port.

The digital-image input port(s) 208 captures digital images via an input port(s) such as an Ethernet port(s), a DVI port(s) and/or a USB port(s). The digital-images can be acquired using, for example, a digital camera or a web camera. The embedded appliance 200 can include more or fewer digital-image input ports, and/or can include more than one digital image input port format, for example, one DVI digital-image input port and one USB digital image input port.

The embedded appliance 200 includes hardware modules and/or software modules implemented in hardware, which can include, for example, ASICs (Application Specific Integrated Circuits), CPUs (Central Processing Units), FPGA (Field Programmable Gate Arrays), modules, DSPs (Digital Signal Processors), processors and/or co-processors. The hardware modules and/or software modules can be configured to perform functions specifically related to capturing, processing, storing and/or sending media signals.

The media module 230 can be implemented as an integrated circuit such as a video chip, audio chip, and/or audio-video chip. The media module 230 can be configured to receive a media signal, decode the media signal, identify input media signal parameters and/or characteristics, convert the media signal, and/or forward the media signal to the modification module 232. By way of example, the media module 230 can be an audio chip that receives an analog audio signal from the audio input port 202, converts the analog audio signal into a digital audio signal, and forwards the digital audio signal to the modification module 232.

The media module 230 can identify media signal parameters and/or characteristics (parameters) for the received media signal, and can be configured to send the identified input media signal parameters to the modification module 232 and/or the processor 250. The media signal parameters identified at the media module 230 can include, for example, a resolution of the media signal, a frame rate of the media signal, an aspect ratio of the media signal, a bit rate of the media signal, a clock rate of the media signal, and/or the like. By way of example, the media module 230 can determine that a media signal received via the video input port 206 is a 1080p 24 fps (frames per second) video signal (e.g., 1920×1080 resolution video at 24 frames per second), and can send a signal representing those input media signal parameters to the modification module 232 and/or processor 250.

In some embodiments, the media module 230 can be configured to detect and/or identify digital parameters (e.g., frame rate, aspect ratio, etc.) for received media signals by reading values for the digital parameters from a set of registers at the media module 230. Such a detection of digital parameters can be done at, for example, an integrated circuit (e.g., ADV7441A chip) of the media module 230. Furthermore, in some embodiments, such a detection can be performed automatically at the media module 230 without any instruction, indication, input or command received from a controller (e.g., the control server 220, the processor 250) or a user (e.g., via the direct control signal 240). That is, the media module 230 can be configured to automatically perform the detection of digital parameters on a received media signal in response to receiving that media signal and without any other input.

Figure 4:
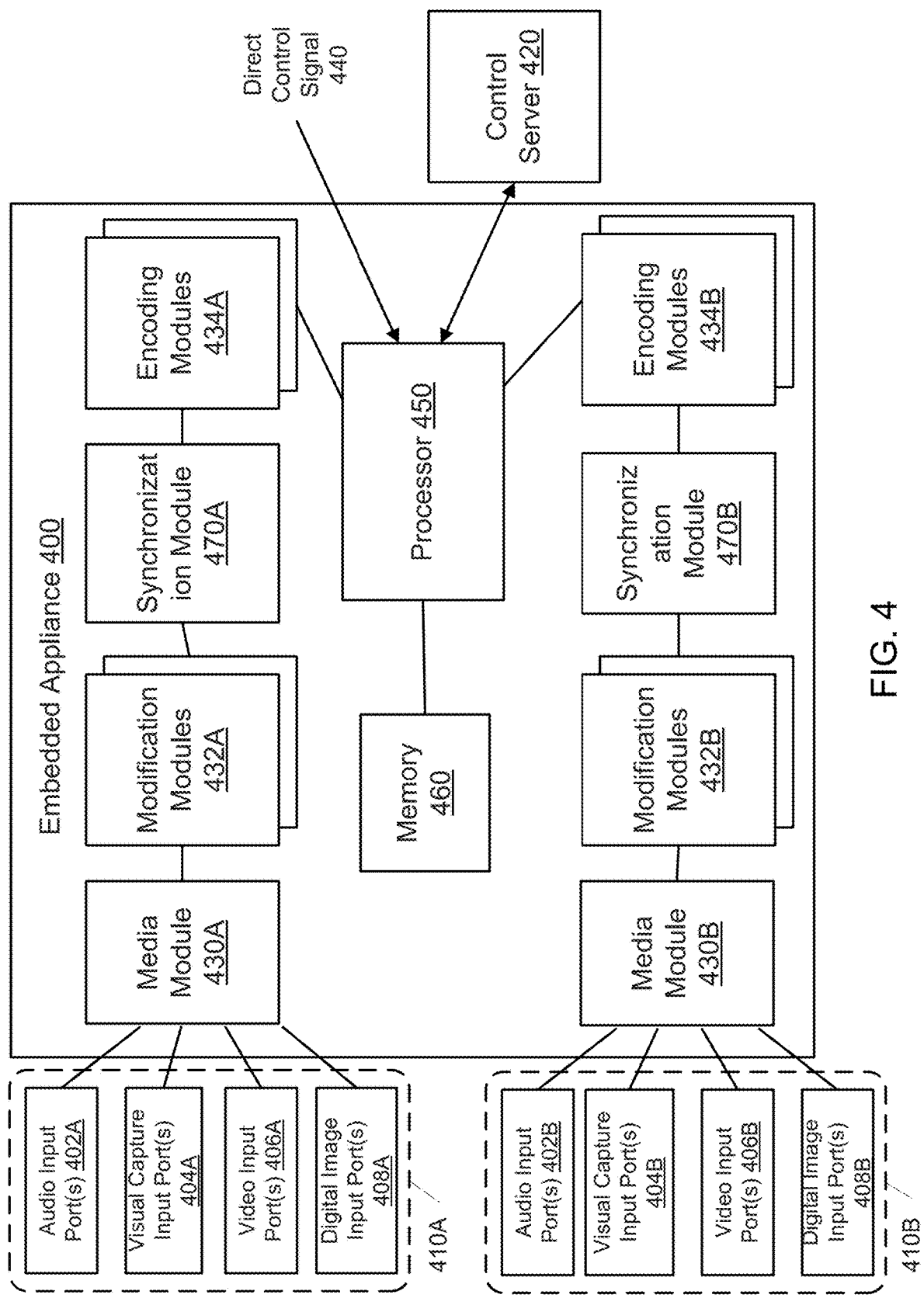
FIG. 4 is a system block diagram that illustrates an embedded appliance having two sets of input ports associated with two sets of modules, a processor, and a memory, according to an embodiment.

While FIG. 2 depicts the embedded appliance 200 as having one media module 230, in some embodiments, the embedded appliance 200 can include more or fewer media modules. In one such embodiment, the embedded appliance 200 can include a video chip media module 230 configured to receive, convert, and send video signals from the visual-capture input port 204, the video input port 206, and/or the digital-image input port 208, and can include an audio chip media module 230 configured to receive, convert, and send audio signals from the audio input port 202. While FIG. 2 depicts the embedded appliance 200 as having one modification module 232 and one encoding module 234, in some embodiments (e.g., as shown in FIG. 4), the embedded appliance 200 can have two or more of each, providing two separately encoded representations of the input signals, possibly with different characteristics (e.g., resolutions, frame rates, bit rates, aspect ratios, etc.).

The modification module 232 can be, for example, a FPGA configured to receive media signals from the media module 230, process and/or otherwise modify the media signals, and send the modified media signals to the encoding module 234. By way of example, the modification module 232 can deinterleave (interlaced to progressive), decimate (scale in time, e.g., 60 fps to 24 fps), resize (scale in height and/or width, e.g., upscale and/or downscale resolution), perform color space conversion (scale in density), modify gain, adjust audio level(s), and/or perform audio multiplexing (selecting an audio signal from a group of audio signals or combining audio signals).

In some embodiments, the modification module 232 can modify the signal based on modification instructions received from the processor 250, modification instructions received from the encoding module 234 and/or input media signal parameters received from the media module 230. The modification instructions can be generated at the processor 250 or the encoding module 234 based on requirements on a desired output media signal such as desired characteristics and/or parameters for the output media signal. In some embodiments, the requirements on the desired output media signal can be generated within the embedded appliance 200 such as, for example, at the processor 250. In other embodiments, the requirements on the desired output media signal can be received at the embedded appliance 200 from an external resource such as, for example, a user (e.g., via the direct control signal 240), the control server 220 and/or any other type of external device that controls the embedded appliance 200.

Furthermore, in some embodiments, requirements on a desired output media signal (e.g., information of desired characteristics and/or parameters of the output media signal) can be received or generated at the embedded appliance 200 prior to an input media signal being received at the embedded appliance 200. In such embodiments, the requirements on the desired output media signal can be defined independent of the input media signal (that is, without any information of the input media signal). The modification instructions can be generated at, for example, the processor 250 based on the requirements on the desired output media signal and/or information (e.g., parameters) of the input media signal. The modification module 232 can be configured to modify the input media signal in real-time, based on the parameters of the input media signal identified at the media module 230 and the modification instructions, to produce the desired output media signal.

For example, at a first time the processor 250 can receive a first signal from the control server 220 indicating that any input video signal is to be modified into an output video signal with a resolution of 1024×768 at 24 fps. At a second time after the first time, the modification module 232 can receive a media signal, for example a video signal with a resolution of 1920×1080 at 30 fps, from the media module 230. The modification module 232 can then receive a first modification instruction from the processor 250 and/or the encoding module 234 associated with modifying a video signal with a resolution of 1920×1080 at 30 fps to a video signal with a resolution of 1024×768 at 24 fps. By following the modification instruction, the modification module 232 can resize the video signal from 1920×1080 to 1024×768, and decimate the video signal from 30 fps to 24 fps. After the modification, the modification module 232 can send the modified media signal to the encoding module 234. Furthermore, when a second modification instruction received from the processor 250 indicates that any input video signal is to be modified into two output media signals with different resolutions, for example, with the second modification for output of an 800×600 video stream at 15 fps, a second modification module (not shown in FIG. 2) can resize and decimate the input video signal to those parameters in real-time, and send the second output video signal to a second encoding module (not shown in FIG. 2). The second modification instruction can be generated at the processor 250 based on a second signal indicating the second modification for output, which is received from a user (e.g., via the direct control signal 240) prior to the input video signal being received at the modification module 232.

The encoding module 234 can be a digital signal processor configured to encode a modified media signal received from the modification module 232. The encoding module 234 is configured to determine media signal modifications and associated modification instructions, and can send those modification instructions to the media module 230 and/or the modification module 232. In some embodiments, when the processor 250 indicates multiple modifications for the same input stream, two or more encoding modules can be used to provide multiple output media streams. The encoding module 234 is also configured to encode, for example, compress, the modified media signal into an encoded signal using a session format, such as, for example H.264/MPEG (Motion Pictures Experts Group) 4 AVC (H.264) at 1920× 1080 resolution. The session format can include an encoded signal profile (e.g., H.264 profile) and level (e.g., H. 264 level), as well as other characteristics such as resolution. The session format can be determined by, for an example, a process that selects the session format from a set of possible session formats, based on the input media signal parameters, user-selected (or default) output parameters, and/or the capabilities of the embedded appliance 200. For example, in some embodiments, the control server 220 can determine a session format based on the output parameters and the embedded appliance capabilities, and can then send a signal representing the determined session format to the encoding module 234 via the processor 250. An output parameter can be, for example, a resolution, speed, and/or file size requested by a user (e.g., a professor that will generate the content on which the media signals will be based).

The control server 220 can be configured to be coupled to two or more embedded appliances 200, and each of the two or more embedded appliances 200 can have different capabilities. An embedded appliance capability can be, for example, a maximum native resolution supported by the input ports, the internal processing capability, and internal storage. The control server 220 can determine a session format in such a heterogeneous appliance environment by basing the determination of the session format on an individual embedded appliance capability in addition to the user-selected parameter for that appliance. For example, the selection of a given set of output parameters can result in a first session format for a first embedded appliance 200, but the selection of the same set of output parameters can result in a second session format, different from the first session format, for a second embedded appliance 200.

A media signal(s) encoded in the session format can be compressed and/or otherwise processed to a greater degree than a native or raw signal, but still configured to be decoded and/or subsequently encoded using a second format. This allows the media signal to be compressed and/or otherwise processed to a greater degree than the native or raw signal, but also compressed and/or otherwise processed to a lesser or a greater degree than the media signal encoded with the session format. By way of example, consider a raw signal that is stored in 10 units of space in a memory; the media signal based on that raw signal and encoded with the session format is stored in 5 units of space in a memory. In this example, the media signal encoded with the session format can be decoded and then encoded by the control server in a second format and is stored in 8 units of space in a memory, and can be encoded by the control server in a third format and is stored in 3 units of space in a memory. As this example illustrates, the session format can be selected by the control server and notified to the embedded appliance such that the embedded appliance compresses or otherwise processes a raw signal into a format appropriate for transport to the control server and subsequent processing by the control server into the desired output format(s). In some embodiments, the degree of compression and/or processing using the session format can determine the maximum range of formats from which subsequent encoding format can be selected. In this manner, if a user requires a high degree of flexibility post capture, as indicated by the selected output parameters, the determined session format may include a low degree of processing and/or compression, resulting in a larger file size. But if a user requires a low degree of flexibility, as indicated by the user-selected output parameters, the determined session format may include a high degree of processing and/or compression, resulting in a smaller file size. Note that in both cases, a common media format can be used but the parameters and/or levels for the media format can differ as just described.

The encoding module 234 can send the encoded signal to the processor 250. In some embodiments, the encoding module 234 can encode and send a video signal received from the modification module 232, and can send an unencoded audio signal associated with that video signal to the processor 250. In such embodiments, the processor 250 can encode the audio signal. In other embodiments, the encoding module 234 can encode and send both an encoded video signal and an associated encoded audio signal to the processor 250. While described above with reference to H.264, the encoding module 234 can encode media signals into other formats, such as for example, a MPEG layer-2 format. The encoding module 234 can also compress media signals into more than one format simultaneously. For example, if the embedded appliance 200 receives a digital-image signal and an associated audio signal, the digital-image signal can be compressed into a JPEG (Joint Photographic Experts Group) format while the audio signal can be compressed into an MPEG audio layer-3 (MP3) format. In some embodiments, the encoding module 234 can compress a single media signal into multiple formats simultaneously. Similarly, one or more media signals can be compressed into a single compressed stream (e.g., MPEG-4).

The processor 250 can receive an encoded media signal from the encoding module 234, store the encoded media signal in the memory 260, and/or send the encoded media signal to the control server 220. In some embodiments, the processor 250 can store the encoded media signal in the memory 260 and can send the encoded media signal to the control server 220 at a later time, such as, for example, during a perceived low traffic time for the control server 220 and/or the network to which the embedded appliance 220 is connected. The processor 250 is configured to receive input media signal parameters from the media module 230 and/or the modification module 232, and to receive user-selected parameters from the control server 220 and/or the direct control signal 240. Similar to the encoding module 234, the processor 250 can also be configured to determine media signal modifications and associated modification instructions, and can send those modification instructions to the media module 230 and/or the modification module 232. The processor 250 is also configured to determine an encoding format and associated encoding instructions and can send those encoding instructions to the encoding module 234. The processor 250 is configured to store an encoded media signal in the memory 260 and to send the encoded media signal to the control server 220 substantially immediately and/or at a time other than real-time based on a send indicator associated with a schedule.

The processor 250 and/or the encoding module 234 can be configured to determine additional instructions to send to the media module 230 and/or the modification module 232 in real-time when the input media signal changes during a capture session. By way of example, the embedded appliance 200 can begin capturing media signals in response to a start indication received from a scheduler or user, and can begin to receive 1920×1080 video at 60 fps. Based on a set of parameters of 1920×1080 video at 24 fps that is requested by a user, the processor 250 and/or the encoding module 234 can define and send a modification instruction to the modification module 232 to only perform decimation on the media signals to reduce the signals from 60 fps to 24 fps. After the modification instruction has been sent, the media signals received by the embedded appliance 200 may change to 1024×768 video at 30 fps. For example, a user of the embedded appliance 200 may disconnect a particular video device with a given input and connect a different video device with a different output format. The processor 250 and/or the encoding module 234, in real-time, can receive an indication from the media module 230 and/or the modification module 232 that the input media signal parameters of the media signal have changed, and the processor 250 and/or the encoding module 234 can define and send a new modification instruction to the modification module 232 to resize the new media signals up to 1920×1080 and to perform decimation on the new media signals to reduce the speed of the medial signals from 30 fps to 24 fps. Anytime the format of a media signal changes and/or a new media signal is added, the processor 250 and/or the encoding module 234 can define and send a new modification instruction, or instructions, to maintain the same modified media signal being received by the encoding module 234.

In some embodiments, the processor 250 can receive from the control server 220, instructions representing the encoding parameters for media signals (e.g., the session format) and/or scheduling instructions for one or more media capture sessions. In embodiments where the processor 250 has received the output parameters and/or the encoding parameters (e.g., the session format) and received a scheduling instruction, the embedded device 200 can capture media signals, based on the schedule or based on a direct control signal from a user, whether or not the embedded appliance 200 remains connected to the control server 220. Said another way, the embedded appliance 200 can continue to operate, e.g., capture media signals, if the embedded appliance 200 is intentionally or unintentionally disconnected from the control server 220. In such embodiments, the embedded appliance 200 can continue to store encoded media signals until onboard memory and/or external memory is filled. In such embodiments, the embedded appliance 200 can be configured to overwrite low priority encoded media signals with higher priority encoded media signals.

The embedded appliance 200 captures any combination of real-time media signals received through the input ports 210. Each of the media signals, although collected via different input ports 210, is synchronously acquired by the embedded appliance 200. For example, even though the sound of chalk against a classroom board can be received via a microphone through the audio input port 202, the motion of a professor's hand wielding the chalk can be received synchronously using a video camera connected to the video input port 206. These media signals are synchronously received and processed by the embedded appliance 200.

In some embodiments, the embedded appliance 200 can be configured to capture only certain portions of media signals. The embedded appliance 200 can be configured to, for example, capture and store sounds received via a microphone while ignoring static and/or silence. The embedded appliance 200 can also be configured to, for example, capture a video signal or a digital-image signal only when movement or a substantial change in a scene is detected. In many embodiments, each of the input ports 210 included in the embedded appliance 200 can be configured to capture one or more media signals at different and/or variable rates. For example, the video input port 206 can be configured to receive video signals at a high frame rate compared with a frame rate of digital images received by the digital-image input port 208.

The memory 260 can be any appropriate type of fixed and/or removable storage device. The memory 260 can be, but is not limited to, a tape, digital-video-disk (DVD), digital-video-cassette (DVC), random-access-memory (RAM), solid state drive (SSD), flash memory and/or hard disk drive. The size of the memory 260 can vary depending on the amount of storage needed for a particular application. For example, the size of the memory 260 can be higher if the embedded appliance 200 is intended to capture large quantities of media signals compressed in a lossless format. The size of the memory 260 can also be higher if the embedded appliance 200 is intended to, for example, capture media signals over relatively long periods of time (e.g., during network down time) without uploading captured media signals to, for example, the control server 220. The memory 260 can be used to prevent the loss of captured media signals that cannot be sent to, for example, the control server 220 because of a network outage. In some embodiments, the processor 250 can, if necessary, use the memory 260 to buffer information received via the input ports 210 before compression.

In some embodiments, a scheduler (not shown in FIG. 2) can be disposed in the embedded appliance 200 and/or in the control server 220, and can generate start and stop indicators to prompt the embedded appliance 200 to, for example, start and stop capturing and/or start and stop sending media signals. The scheduler can access a schedule that is either stored locally on the embedded appliance 200 or on the control server 220. The schedule can include, for example, start and stop times that are specific to input ports 210. For example, if a professor will teach a one-hour class on one day of the week, every week for four months, the scheduler can use a schedule to prompt the embedded appliance 200 to capture the professor's lecture for one hour on the day of the lecture every week for the four-month time period. The scheduler can be configured to capture or send media signals according to more than one schedule stored on, for example, the embedded appliance 200.

The scheduler can generate a schedule or receive a schedule from the control server 220. For example, the scheduler can generate a schedule for sending captured media signals based on input from the control server 220 indicating preferred transmission times. In some embodiments, the scheduler can access and execute a schedule that is, for example, sent from the control server 220 and stored in the memory 260 of the embedded appliance 200. In some embodiments, the scheduler can be used to start and stop not only the capturing and/or sending of media signals by the embedded appliance 200, but also the processing and/or storing of media signals.

Rather than using a schedule to prompt the capturing and/or sending of media signals, the scheduler can prompt certain functions to be performed based on defined criteria. For example, the scheduler can be configured to prompt the sending of media signals from the embedded appliance 200 when a certain amount of bandwidth is available for use by the embedded appliance 200. In some embodiments, the scheduler is included as a hardware and/or software module that is separate from the processor 250.

While FIG. 2 depicts the embedded appliance 200 having a discrete media module 230, modification module 232, encoding module 234, and processor 250, in some embodiments, the embedded appliance 200 includes a single processor that can be any type of processor (e.g., an embedded processor or a general purpose processor) configured to define and/or operate within an embedded environment. The single processor can be configured to execute the functions performed by the processor 250, the media module 230, the modification module 232, the encoding module 234 and/or other functions within the embedded appliance 200. In some embodiments, each of the modules and processor can be embodied in a single piece of hardware, across multiple pieces of hardware, and/or on shared hardware.

In some embodiments, the start and stop indicators from the scheduler can be based on variables such as the storage and/or sending capacity of each embedded appliance 200. The control server 220 can query each embedded appliance 200 to determine, for example, how much capacity of the memory 260 of each embedded appliance 200 is available. The control server 220 can also, for example, receive a signal from each embedded appliance 200 indicating how much capacity of the memory 260 of each embedded appliance 200 is available. The control server 220 can then prioritize and prompt the sending of information from the embedded appliances 200 based on memory capacity indicators.

FIG. 2 also illustrates that the embedded appliance 200 can be controlled using a direct control signal 240 from, for example, a user. The embedded appliance 200 can include an interface such as a graphical user interface (GUI) (not shown in FIG. 2), physical display (not shown in FIG. 2) or buttons (not shown in FIG. 2) to produce the direct control signal 240 to control some or all of the functions that can be performed by the embedded appliance 200. The direct control signal 240 can be used to, for example, modify a schedule stored on the embedded appliance 200, modify the processing of media signals, troubleshoot an error on the embedded appliance 200 or control the embedded appliance 200, for example, while the control server 220 is down. The direct control signal 240 can also be used to, for example, start and stop capturing and/or sending of media signals. The embedded appliance 200 can be configured to require authentication (e.g., username/password) of, for example, a user before accepting a direct control signal 240 sent via an interface (not shown in FIG. 2) from the user. The direct control signal 240 can also be generated using, for example, an interface (not shown in FIG. 2) that is not directly coupled to the embedded appliance 200. In some embodiments, the embedded appliance 200 can be directly controlled using the control server 220.

In some embodiments, the embedded appliance 200 can include other software and/or hardware modules to perform other processing functions such as, for example, encoding, decoding, indexing, formatting and/or synchronization of media signals.

While FIG. 2 depicts the embedded appliance 200 being coupled to a single control server 220 that both controls and/or instructs the operations of the embedded appliance 200 and receives the output media signals from the embedded appliance 200, in some embodiments (as shown and described with respect to FIG. 1), the embedded appliance 200 can be coupled to two or more than two server devices that each performs a different functionality. For example, the embedded appliance 200 can be coupled to a control server (similar to the control server 120 in FIG. 1) and a storage server (similar to the server 130 in FIG. 1). The control server can be configured to generate and send instructions (e.g., modification instructions, requirements on desired output media signals) to the embedded appliance 200, such that modules in the embedded appliance 200 can perform signal detection, modification, encoding, and/or the like, based on the instructions. The storage server can be configured to receive output media signals from the embedded appliance 200, process the output media signals to make them available for users, and/or distribute the output media signals to other devices and users.

Figure 3:
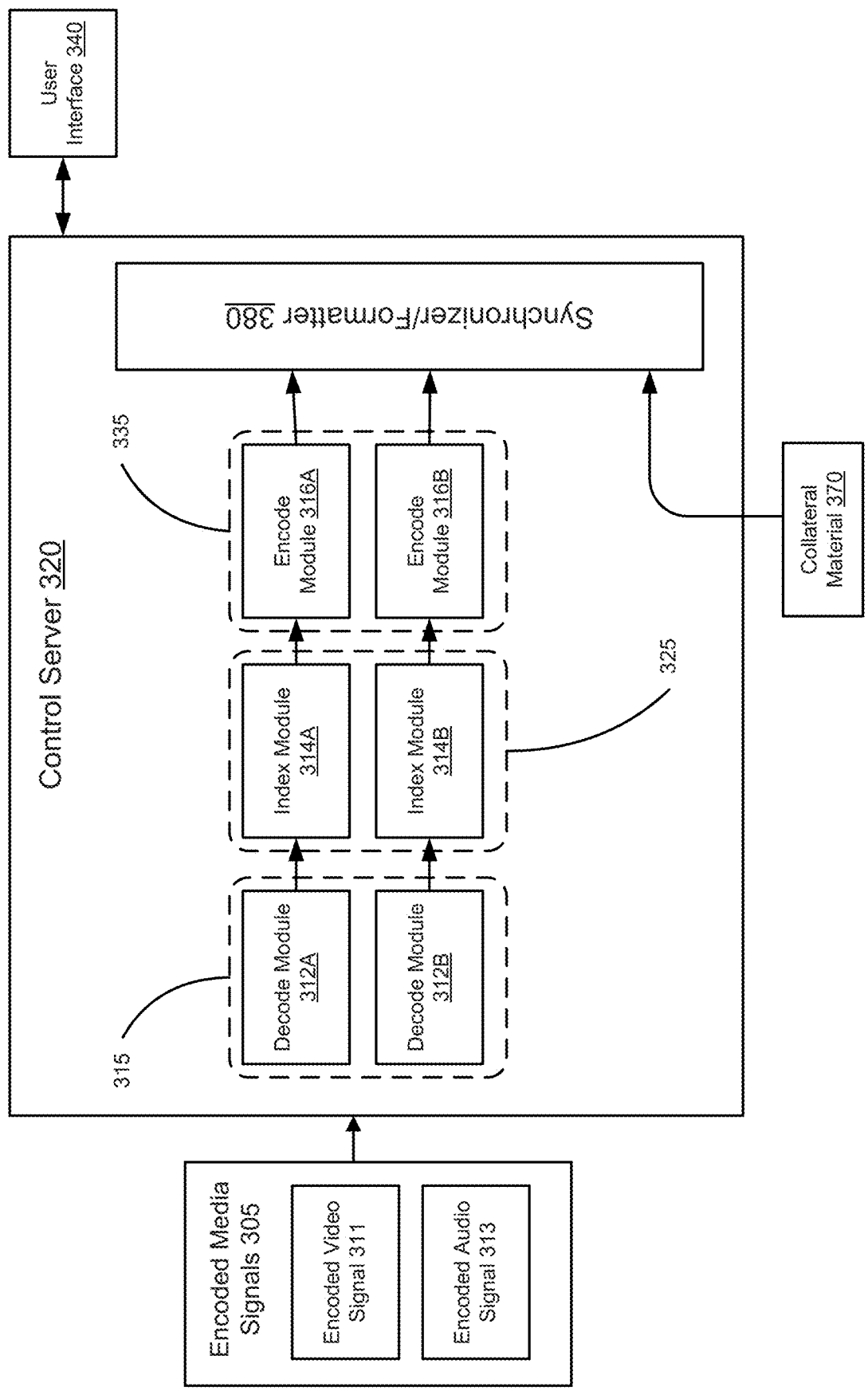
FIG. 3 is a block diagram that shows the flow of media signals through a control server, according to an embodiment.

FIG. 3 is a block diagram that shows the flow of media signals from an embedded appliance (similar to the embedded appliance 100 and the embedded appliance 200 in FIGS. 1 and 2) through modules in a control server 320. The control server 320 receives encoded real-time or stored media signals 305 encoded in a session format, and including an encoded video signal 311 and an encoded audio signal 313. Although this figure shows that each of the components of the media signals 305 is received as a multiplexed signal, over, for example, an Internet protocol (IP) network connection that can be de-multiplexed by the control server 320 when received, in some embodiments, the media signals 305 can be sent to the control server 320 as one or more discrete signals. For example, audio and video signals can be combined into a single MPEG-2 signal at the embedded appliance before being sent by the embedded appliance to the control server 320. Also, the control server 320 can receive media signals 305 from more than one embedded appliance and can process each of the media signals 305 in parallel using, for example, multi-threaded processing.

Each of the compressed media signals 305 that are received by the control server 320 are similarly processed. Each of the media signals 305 can be processed by one of the decode modules 315 (e.g., decode module 312A or 312B), index modules 325 (e.g., index module 314A or 314B) and encode modules 335 (e.g., encode module 316A or 316B). After each of the media signals 305 has been processed (e.g., individually processed, processed as a group), the signals are synchronized and/or formatted by the synchronizer/formatter 380.

The processing of the encoded video signal 311 will be used herein as a representative example of the processing of the compressed media signals 305. The processing of the remaining signals 305 can be understood in light of this representative example.

When the encoded video signal 311 is received by the control server 320, the encoded video signal 311 can be decompressed from the session format by the decode module 315 into a decoded video signal. The decode module 315 can be configured to detect the session format of the encoded video signal 311 when the encoded video signal 311 is received so that the signal 311 can be properly decoded/decompressed. The encoded video signal 311, when converted into a decoded video signal, can be decoded to another format other than the session format and can be used by the control server 320 to continue processing the signal. In some embodiments, the encoded video signal 311 can be received in the session format and can be stored in that format. In such embodiments, the control server 320 can decode the encoded video signal 311 at a later time, for example, at the request of a user.

The decoded video signal is then processed by the index module 325 to index the decoded video signal by, for example, determining and marking scene changes. The indexing is performed so that the decoded video signal can later be properly synchronized with the other media signals 305 by the synchronizer/formatter 380 and to provide relevant index points for use by, for example, an end-user (not shown in FIG. 3). Segments, rather than scenes, can be detected from the encoded audio signal 313 using the index module 314B so that the encoded audio signal 313 can be properly synchronized with the other media signals 305 and to provide relevant index points for use by, for example, an end-user. The decoded video signal with indexing (e.g., scene change markings) is then encoded by the encode module 316A into an encoding that can be synchronized and formatted by the synchronizer/formatter 380.

Returning to the general discussion of FIG. 3, the synchronizer/formatter 380 receives the media signals 305 after processing through the decode module 315, the index module 325 and the encode module 335. The synchronizer/formatter 380 indexes, synchronizes and formats the media signals so that they can be accessed by a user via a user interface 340. In the synchronization process, the scenes from each of the media signals and the audio segments are synchronized so that, for example, the sound of a dropped pen hitting a floor is matched with video of the pen hitting the floor. The synchronized media signal can be formatted by the synchronizer/formatter 380 into one or more formats that can be used by a user. By way of example, the user can initially request certain output parameters for the encoded media signal, resulting in the media signal being encoded in a session format, but later request the encoded media signal in a different format. For example, the output parameters can result in an encoded media signal having 1024×768 video at 24 fps; but then the user can request to download the media format to a portable device having a maximum resolution of 800×600. In such an example, the control server 320 can send the stored encoded media signal 305 through the decode module(s) 315, the index module(s) 325, the encode module(s) 335, and the synchronizer/formatter 380 to reformat the media signal 305 at 800×600 video at 24 fps. In this manner, the encoded video signal can take up less memory on the portable device.

The synchronizer/formatter 380 can receive collateral material 370 and can combine collateral material 370 with the media signals 305 that have been processed by the modules. The collateral material 370 can be, for example, additional marking information that can be combined with the processed media signals to aid in the synchronizing process. In some embodiments, the collateral material 370 can be additional media signals captured by other multimedia capture devices (not shown in FIG. 3) that are to be combined with the media signals 305 already shown. Although not shown in FIG. 3, the control server 320 can include separate modules that decode, index (e.g., scene/segment detect or optical character recognition) and/or encode the collateral material 370 received by the control server 320.

Although FIG. 3 shows that separate modules perform decoding, indexing, encoding, synchronizing and formatting, the functions of each of the modules can be further subdivided and/or combined into one or more processors or modules. These functions can also be subdivided and/or combined onto more than one control server. Also, the control server 320 can include a memory (not shown in FIG. 3) or a separate database (not shown in FIG. 3) for storing information and/or buffering information that is received from one or more embedded appliances.

Any combination of the functions performed by any of the modules and/or other components of the control server 320 can alternatively be performed on an embedded appliance. For example, the indexing can be performed by an embedded appliance before the media signals are compressed and transmitted to the control server 320.

The control server 320 can also receive an input signal from a user via the user interface 340. The user interface 340 can be, for example, a remote computer that is interfacing with the control server 320 via a network connection and/or can be an interface that is integrated into the control server 320. The user interface 340 can be used to control any of the modules and their associated functions and/or to specify parameters for processing information on the control server 320. A user input signal can specify, for example, the type of format that should be used by the synchronizer/formatter 380 for a particular set of media signals 305 received at the control server 320. A user interface 340 can be configured so that a user can manually manipulate any of the media signals 305 received by embedded appliances distributed across a network.

The user interface 340 can also be used to access, monitor and/or control any embedded appliances (not shown in FIG. 3) that can be connected to the control server 320 and distributed, for example, over a network. Access to embedded appliances and/or the control server 320 via the user interface 340 can be, for example, password protected. The user interface 340 can be used to define, for example, schedules used by the embedded appliance or schedules used by the control server 320 to send signals to start and stop capturing, processing, storing and/or sending by distributed embedded appliances. The user interface 340 can also be used to view confidence monitoring signals that can be generated by embedded appliances connected to the control server 320.

The user interface 340 can also be used to access the final synchronized/formatted content generated by the control server 320. More than one user interface 340 can be distributed across a network and can be configured to access the content produced by the control server 320 (e.g., personal computers distributed over a university network accessing the control server 320). In some embodiments, the control server 320 sends the content to a server (not shown in FIG. 3) where the content is made available to one or more users through the user interface 340.

FIG. 4 is a system block diagram that illustrates an embedded appliance 400 having two sets of input ports (input ports 410A and 410B) associated with two sets of modules, a processor 450, and a memory 460, according to an embodiment. The embedded appliance 400 can be similar to the embedded appliance 200 (in FIG. 2) and can include similar elements with similar functionality. By way of example, the processor 450 of the embedded appliance 400 can be similar to the processor 250 of the embedded appliance 200. Unlike the embedded appliance 200, however, the embedded appliance 400 includes two sets of inputs and modules, including two sets of input ports 410A and 410B, two media modules 430A and 430B, two sets of modification modules 432A and 432B, two synchronization modules 470A and 470B, and two sets of encoding modules 434A and 434B. In this manner, the embedded appliance 400 can simultaneously process and modify more simultaneous signals from more inputs. By way of example, the "A" set of inputs and modules can capture, process, and store one or more media signals using a first session format, while the "B" set of inputs and modules can capture, process, and live stream the same (or different) one or more media signals using a second session format. In other embodiments, both sets of inputs can be used for a live stream and/or for a stored encoded media signal. Additionally, as discussed above with respect to FIG. 2 and shown in FIG. 4, each channel (the "A" channel and the "B" channel) can have one or more than one modification module (e.g., the modification modules 432A and 432B) and/or one or more than one encoding module (e.g., the encoding modules 434A and 434B).

As shown in FIG. 4, the embedded appliance 400 includes the synchronization modules 470A and 470B that are not included in the embedded appliance 200 shown in FIG. 2. The synchronization modules 470A and 470B align sets of input signals with disparate time bases to a common time base. The common time base can be derived from one input signal or from a reference time base unaligned with any input signal. The synchronization modules 470A and 470B cause the numbers of media samples (e.g., audio samples, video frames) during a specific time period to be in correct agreement throughout a capture or capture session for the sample rates requested by, for example, the control server 420. In some embodiments, the synchronization modules 470A and 470B use sample deletion and sample insertion to ensure that all media signals are synchronized after encoding. In other embodiments, the synchronization modules 470A and 470B use sample blending techniques (e.g., resampling, telecine, etc.).

For example, if the control server 420 instructs the processor 450 to capture video at 15 fps and audio at 44100 samples per second (sps), the synchronization modules 470A and 470B each can use an audio clock as the time base. If the actual input video frame rate is ideally 29.97 fps, then the modification modules 432A and 432B can be configured to decimate frames from 29.97 fps to 15 fps using, for example, a simple counter with a numerator of 15000 and a denominator of 29970. In operation, the modification modules 432A and 432B can be configured to add 15000 to the numerator for each input video frame and emit a video frame whenever the numerator is at least equal to the denominator. The numerator is then reduced modulo the denominator for the next video frame. That is, the denominator is subtracted from the numerator until the numerator is less than the denominator. Such a method is then repeated for the next input video frame.

The method described above will provide for the proper ratio of input and output frames. The method alone, however, typically does not account for an input clock that varies over the duration of capture, nor does it typically recover from the loss of an input signal. For example, in practice, the input clock is not the ideal 29.97 fps but may drift up or down as the source equipment (e.g., a source video camera, a source computer providing the display images) warms or cools. When multiple sources are involved, their clocks will almost always be derived from different time bases and thus should undergo treatment to maintain a perfect synchronization when encoded with idealized frame and sample rates. If the preceding method were used in a high frame rate setting, for example, even a small amount of clock drift between sources could result in noticeable loss of sync between the audio and video after hours of capture.

To address this issue, timestamps on the sampled media signals (video frames or audio blocks) and a sample count can be used (e.g., at the media modules 430A and 430B) to encode exactly the proper number of video frames by the encoding modules 434A and 434B for a given number of audio samples. The synchronization modules 470A and 470B can be configured to maintain a time window, allowing a configurable amount of leeway, in which a frame arrives from the modification modules 432A and 432B. For example, if the synchronization module 470A receives a frame that arrives too early (that is, the timestamp of the frame is earlier than the current encoding window, possibly because the input clock has drifted and is now faster), the synchronization module 470A does not send that frame to the encoding module 434A. If the synchronization module 470A determines that the current time window has expired, the synchronization module 470A sends the previous frame to the encoding module 434A, resulting in a duplicate frame (unless the previous frame was too early). After a configurable number of duplicated frames, the synchronization module 470A can switch to a frame that contains an indication of lost signal (e.g., a black screen, a blue screen, a screen with certain text, etc.). Whenever a frame is sent to the encoding module 434A, the synchronization module 470A will update its time window to the ideal window based on the time base and the number of frames so far encoded. This method allows all the input media samples to remain synchronized after encoding despite being supplied with disparate and varying clocks.

In some embodiments, modules other than the synchronization modules 470A and 470B can also perform a function related to the synchronization functionality on media signals. For example, as described above, the media modules 430A and 430B can be configured to determine a timestamp for each frame of media signals received from the input ports 410A and 410B, such that the media signals can be synchronized based on the timestamps at the synchronization module 470A and 470B.

Figure 5:
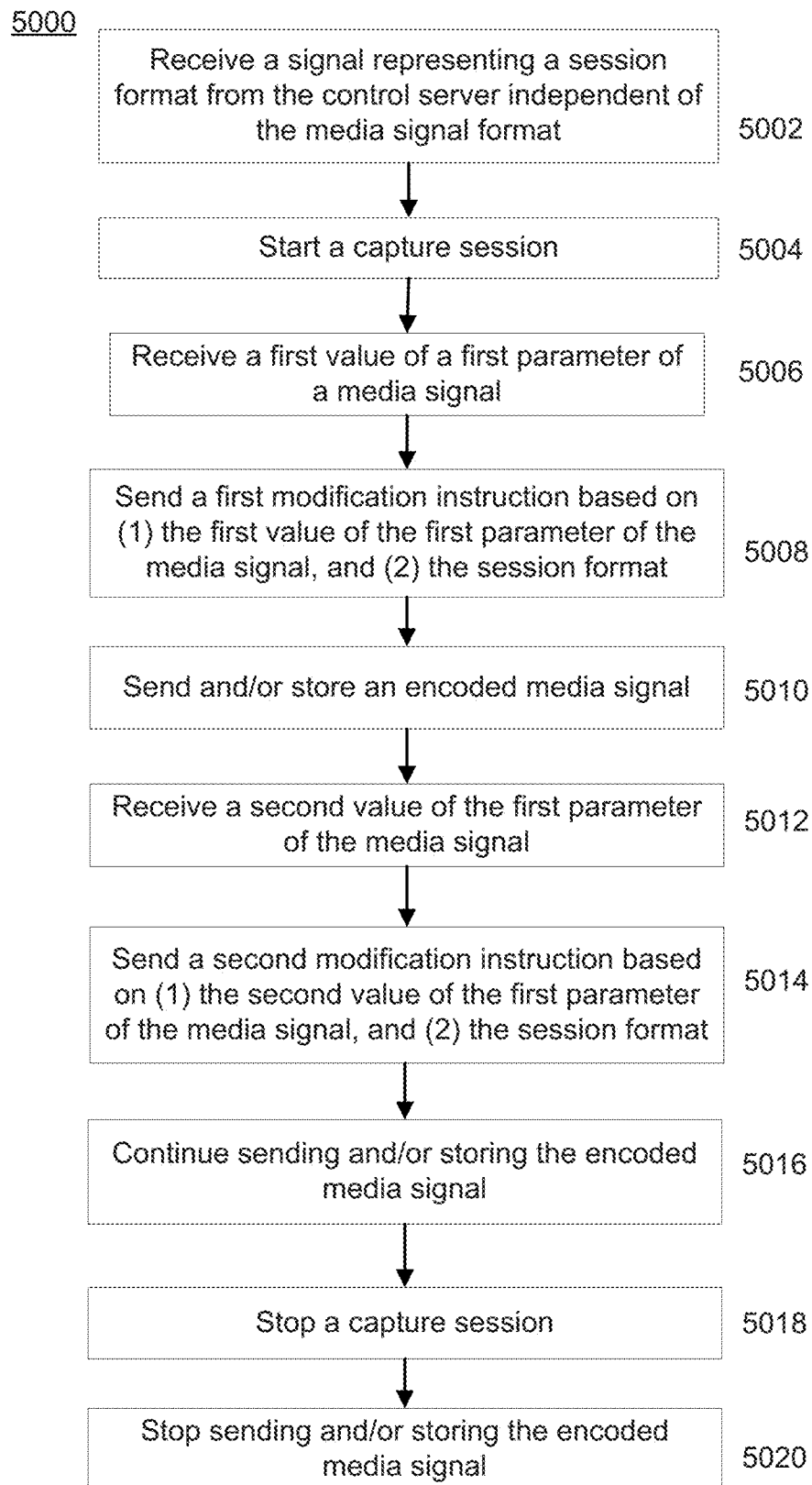
FIG. 5 is a flowchart that illustrates a method of using an embedded appliance, according to an embodiment.

FIG. 5 is a flowchart illustrating a method 5000 of capturing, processing, storing and/or sending of media signals using an embedded appliance according to an embodiment of the invention. According to the method 5000, and with reference to FIG. 2, the processor 250 can receive a signal representing a session format based on output parameters and/or embedded appliance capabilities from the control server 220, at 5002. In some embodiments, the output parameters can be input directly into the embedded appliance 200 by the user via an interface described above. The session format can be, for example, a desired format for a capture session as specified by the user of the control server 220 or a user providing direct input to the embedded appliance 200. As such the session format can be specified independent of the format of the media signals to be captured during the capture session. In other words, the session format can be specified by user of the control server 220 or the user providing direct input to the embedded appliance 200 without that user having any knowledge of the format of the media signals to be captured or the types of media capture devices coupled to the input ports 210 of the embedded appliance 200.

The processor 250 can receive an indication to start a capture session, at 5004. The indication to start the capture session can be based on, for example, a schedule or a direct input from a user of the embedded appliance 200. A capture session can be any amount of time and can be determined, for example by a schedule, a default value (e.g., 1 hour increments), or dynamically based on user input. The processor 250 and/or the encoding module 234 can receive a first value of a first parameter of an input media signal from the media module 230 and/or the modification module 232, at 5006. The first value of the first parameter of the input media signal can be, for example, a value of a resolution or frame rate of a video media signal received at an input port 210 and automatically detected by the media module 230 upon receiving the video media signal from the input port 210.

The processor 250 and/or the encoding module 234 can send a first modification instruction based on the first value of the first parameter and the session format to the media module 230 and/or the modification module 232, at 5008. This first modification instruction can be calculated, for example, by the processor 250 and/or the encoding module 234 after the first value of the first parameter and the session format are received. In other words, this first modification instruction can be calculated during or after the capture session, and need not be predetermined or selected from a preexisting list of options before the capture session starts. In fact, the first modification instruction can be calculated for any format of media signals or any type of media capture devices coupled to the input ports 210 of the embedded appliance 200, and is not limited or constrained by the formats of media signals or the types of media capture devices coupled to the input ports 210 of the embedded appliance 200.

The processor 250 can store in the memory 260 and/or send to the control server 220 an encoded media signal received from encoding module 234, at 5010. When the encoded media signal is sent to a control server, the encoded media signal can be sent to the control server 220 that initially sent the signal representing the session format or to a different server designated to receive the encoded media signal for possible further processing and subsequent distribution.

The processor 250 and/or the encoding module 234 can receive a second value of the first parameter of an input media signal from the media module 230 and/or the modification module 232, at 5012. The second value of the first parameter of the input media signal can be, for example, a value of a resolution or frame rate of a video media signal received at an input port 210 and automatically detected by the media module 230 upon receiving the video media signal from the input port 210.

The processor 250 and/or the encoding module 234 can send a second modification instruction based on the second value of the first parameter and the session format to the media module 230 and/or the modification module 232, at 5014. Similar to the discussion above regarding the first modification instructions, this second modification instruction can be calculated, for example, by the processor 250 and/or the encoding module 234 after the second value of the first parameter and the session format are received. In other words, this second modification instruction can be calculated during or after the capture session, and need not be predetermined or selected from a preexisting list of options before the capture session starts. In fact, the second modification instruction can be calculated for any format of media signals or any type of media capture devices coupled to the input ports 210 of the embedded appliance 200, and is not limited or constrained by the formats of media signals or the types of media capture devices coupled to the input ports 210 of the embedded appliance 200.

The processor 250 can store in the memory 260 and/or send to the control server 220 an encoded media signal received from the encoding module 234, at 5016. When this encoded media signal is sent to a control server, the encoded media signal can be sent to the control server 220 that initially sent the signal representing the session format or to a different server designated to receive the encoded media signal for possible further processing and subsequent distribution.

The processor 250 can receive an indication to stop the capture session based on the schedule, a stop indicator associated with the schedule, the default value, and/or dynamically based on user input, at 5018. The processor 250 can stop sending and/or storing the encoded media signal, at 5020.

Figure 6:
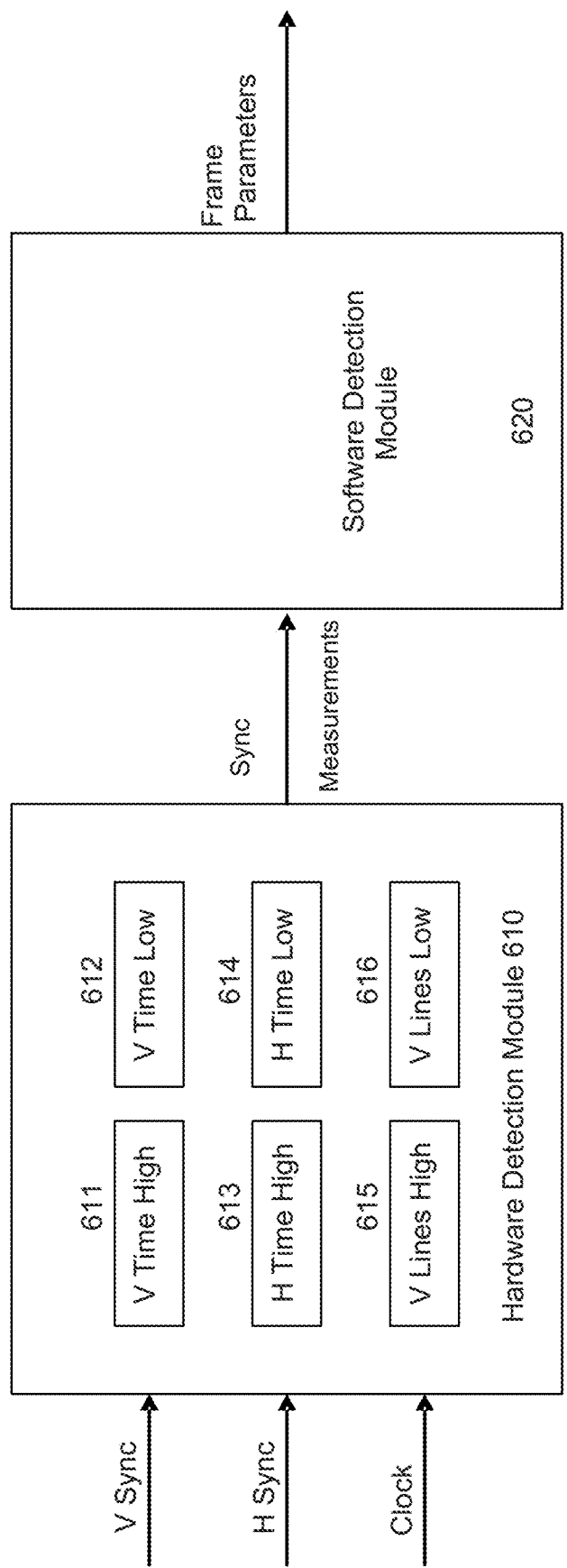
FIG. 6 is a block diagram that illustrates a hardware detection module coupled to a software detection module configured to measure and test the timing of horizontal and vertical sync pulses in an embedded appliance, according to an embodiment.

FIG. 6 is a block diagram that illustrates a hardware detection module 610 coupled to a software detection module 620 configured to measure and test the timing of horizontal and vertical sync pulses in an embedded appliance, according to an embodiment. In some embodiments, the hardware detection module 610 and the software detection module 620 can be located anywhere in the embedded appliance. For example, the hardware detection module 610 can be part of a modification module (e.g., the modification module 432A or 432B in FIG. 4) of the embedded appliance, and the software detection module 620 can be stored in a memory and/or executed at a processor of a synchronization module (e.g., the synchronization module 470A or 470B in FIG. 4) or an encoding module (e.g., the encoding module 434A or 434B in FIG. 4) of the embedded appliance.

The hardware detection module 610 and the software detection module 620 can be any hardware module and software module (stored and/or executed in hardware), respectively, which are collectively configured to determine frame parameters based on media signals (e.g., VGA sync signals) received from, for example, input ports of the embedded appliance. Although not shown in FIG. 6, the hardware detection module 610 can include, for example, circuits, registers, etc., which are configured to determine a set of measurements based on the received media signals. The software detection module 620 can include, for example, a memory, a processor, software (e.g., method or process), etc., which are configured to perform a method (e.g., the method of FIG. 7) to determine frame parameters based on the set of measurements.

Although the hardware detection module 610 and the software detection module 620 are described herein as a hardware module and a software module, respectively, in other embodiments, the hardware detection module 610 and the software detection module 620 can be implemented in any other combination such as, for example, both being hardware modules, both being software modules, the hardware detection module 610 being a software module and the software detection module 620 being a hardware module, etc.

As shown in FIG. 6, the hardware detection module 610 can be configured to receive signals associated with media signals such as a vertical sync signal (Vsync), a horizontal sync signal (Hsync), a clock signal (Clock), and/or the like. In some embodiments, the sync signals received at the hardware detection module 610 can be, for example, VGA sync signals.

Figure 8:
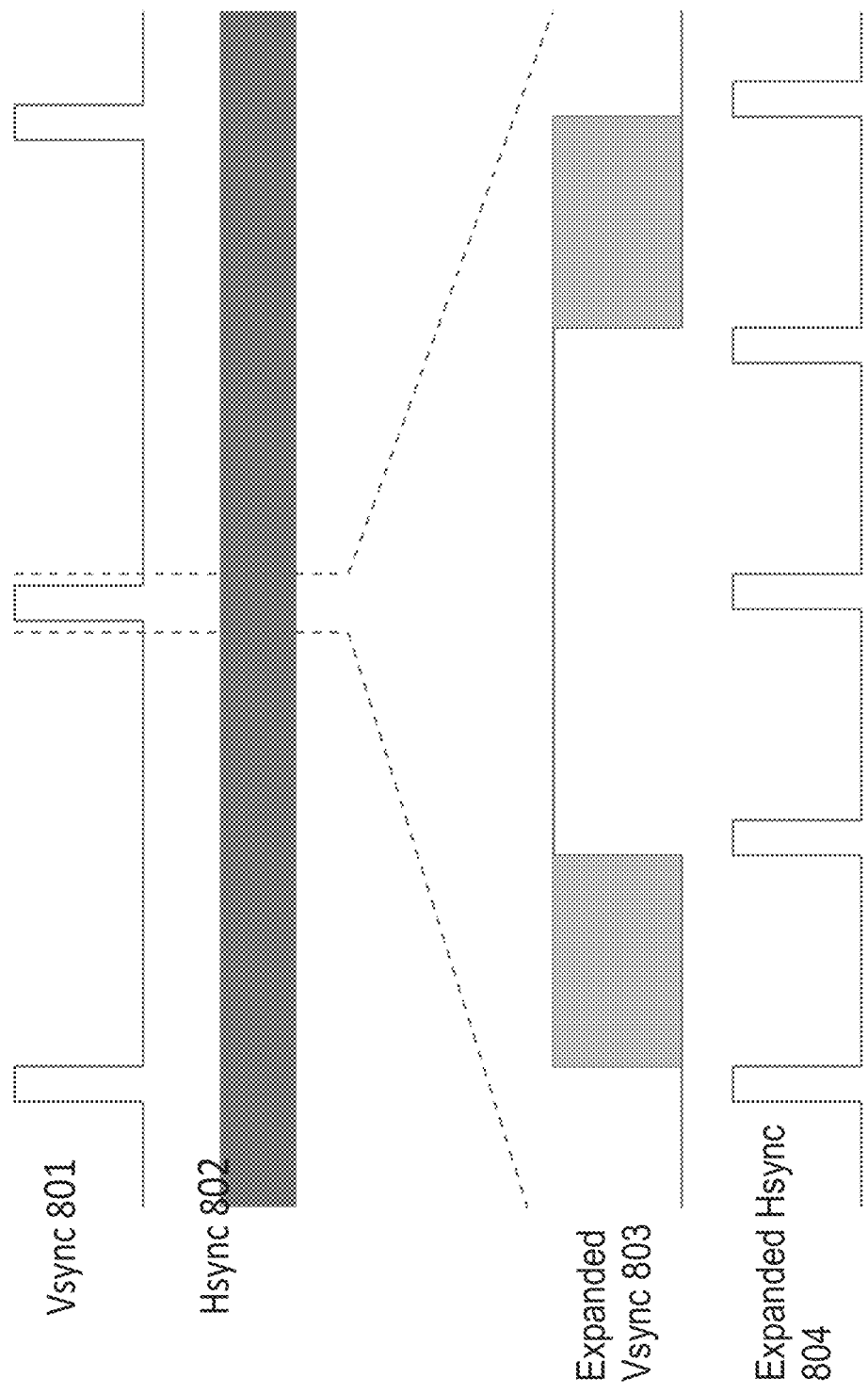
FIG. 8 is a schematic illustration of VGA (Video Graphics Array) sync signals, according to an embodiment.

FIG. 8 is a schematic illustration of VGA sync signals, according to an embodiment. The top half of FIG. 8 shows a vertical sync signal (Vsync 801) and a horizontal sync signal (Hsync 802), each including multiple pulses, over the course of over two frames. In this diagram, the x-axis represents time and the y-axis represents amplitude of the signals. The Vsync 801 and the Hsync 802 are similar to the vertical sync signal and the horizontal sync signal, respectively, shown and described with respect to FIG. 6 as being received at the hardware detection module 610.

In this example of FIG. 8, the Hsync pulses of the Hsync 802 occur too often to distinguish visually on the diagram. Accordingly, the bottom half of FIG. 8 shows an expanded vertical sync signal (Expanded Vsync 803), which is an expansion of the area around one Vsync pulse of the Vsync 801; and an expanded horizontal sync signal (Expanded Hsync 804), which includes five Hsync pulses of the Hsync 802 in the same time frame for the Expanded Vsync 803. The diagram for the Expanded Vsync 803 also shows two valid regions (in grey) where a Vsync transition (e.g., from low to high, from high to low) can occur.

In some embodiments, the Vsync 801 and the Hsync 802 are the only two input signals that are included in a typical input to a hardware detection module (e.g., the hardware detection module 610 in FIG. 6) for detections of a video standard (e.g., VGA detections). Additionally, a clock input (e.g., the clock signal (Clock) in FIG. 6) can be available at the hardware detection module; this clock input can be any stable clock with a period shorter than the narrowest expected Hsync pulse of the Hsync 802. Such a clock input can serve as a time base for all time-related measurements for the VGA detections.

Returning to FIG. 6, the hardware detection module 610 can be configured to measure values based on the received sync signals (Vsync, Hsync) and clock signal (Clock). As shown in FIG. 6, the values measured at the hardware signal detection module 610 can include, for example, the length of time that Vsync is high (value 611), the length of time that Vsync is low (value 612), the length of time that Hsync is high (value 613), the length of time that Hsync is low (value 614), the number of lines where Vsync is high (value 615), the number of lines where Vsync is low (value 616), and/or the like. In the case of the values 611-614, the length of time is defined as the number of pulses of the input clock for that stage of the signal. For the values 615 and 616, the registers of the hardware detection module 610 can contain an actual number of lines (Hsync pulses) counted. Specifically, the value 615 represents the actual number of lines counted when Vsync is high (e.g., digital 1), and the value 616 represents the actual number of lines counted when Vsync is low (e.g., digital 0). All of the registers of the hardware detection module 610 can be simple synchronous counters that are buffered in such a way that a single read of the registers will return valid values for a complete frame. These measurements are then read as sync measurements by the software detection module 620, as shown in FIG. 6.

Figure 9:
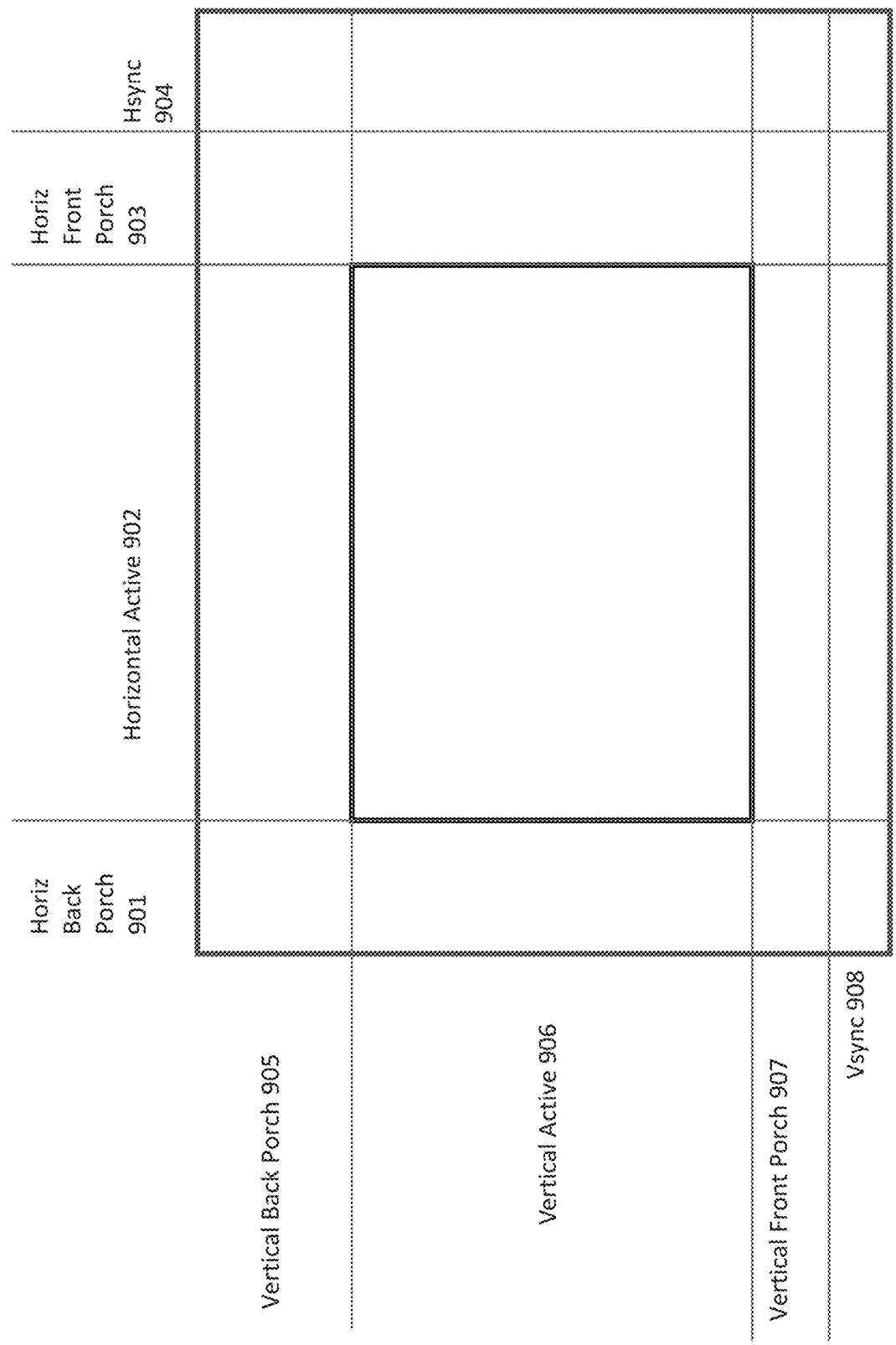
FIG. 9 is a schematic illustration of the frame parameters that make up the timing for a VGA frame, according to an embodiment.

The software detection module 620 can be configured to determine, based on the sync measurements received from the hardware detection module 610, a set of frame parameters used for identification of a video standard (e.g., a VGA standard). FIG. 9 is a schematic illustration of the frame parameters that characterize the timing for a VGA frame, according to an embodiment. As shown in FIG. 9, the frame parameters include: Horizontal Back Porch 901, Horizontal Active 902, Horizontal Front Porch 903, Hsync 904, Vertical Back Porch 905, Vertical Active 906, Vertical Front Porch 907, and Vsync 908. Additional parameters include, for example, a frame rate, a Vsync polarity, a pixel rate, a Hsync polarity, and/or other frame parameters.

Returning to FIG. 6, the software detection module 620 transforms the sync measurements (611-616) received from the hardware detection module 610 into the set of frame parameters (e.g., the 12 frame parameters discussed above with respect to FIG. 9). In some embodiments, these frame parameters can be used by a media module (e.g., the media module 430 A/B in FIG. 4), a modification module (e.g., the modification module 432 A/B in FIG. 4), and/or an encoding module (e.g., the encoding module 434 A/B in FIG. 4) associated with the hardware detection module 610 and the software detection module 620.

Figure 7:
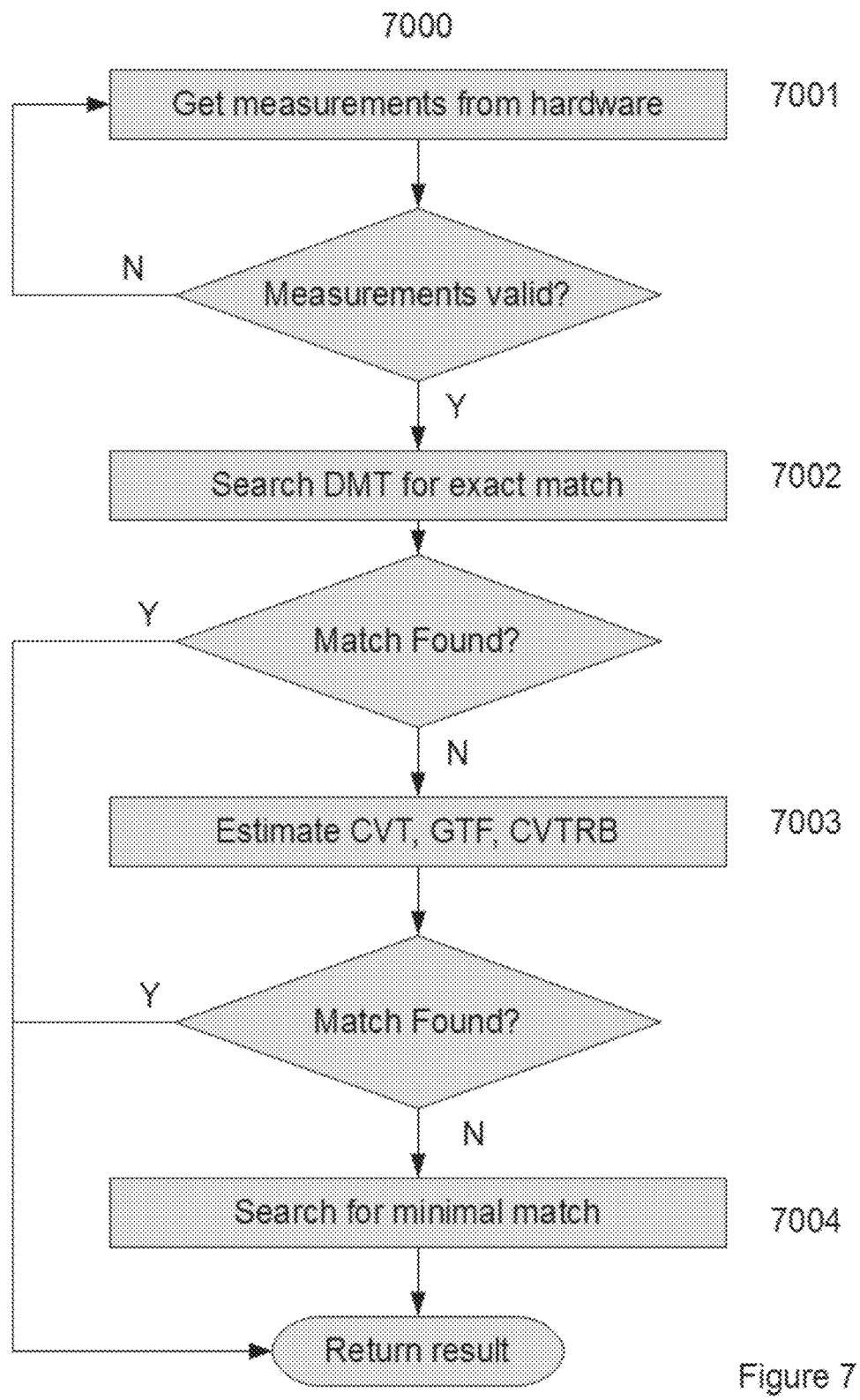
FIG. 7 is a flowchart illustrating a method of detecting or identifying a video standard for signals received in an embedded appliance, according to an embodiment.

FIG. 7 is a flowchart illustrating a method 7000 of detecting or identifying a video standard for signals, according to an embodiment. In some embodiments, the method 7000 can be executed at a software detection module in a media module of an embedded appliance, such as the software detection module 620 shown and described with respect to FIG. 6. Specifically, the method 7000 uses the data received from a hardware detection module (e.g., the hardware detection module 610 in FIG. 6) and applies complex software methods or processes to derive the resolution and timing of, for example, a VGA signal. By performing the method 7000, the software detection module is capable of detecting or identifying a video standard for each video signal from multiple possible video standards such as, for example, Discrete Monitor Timing (DMT), Generalized Timing Formula (GTF), Coordinated Video Timing (CVT), Coordinated Video Timing with Reduced Blanking (CVT-RB), and High Definition Television (HDTV) using the horizontal sync and vertical sync signals.

As shown in FIG. 7, the detection starts with receiving a signal representing the measurements at 7001 from the hardware detection module and testing them for validity. The measurements can be the values 611-616 of FIG. 6. The measurements are deemed valid by cross checking detected pulse widths against a range derived from detected pulse counts. If the measurements are determined to be invalid or illegal, the measurements can be dropped or discarded and the software detection module is ready to receive new measurements.

At 7002, the measurements are tested for an exact match with some known standard values such as, for example, values for DMT and HDTV. If a suitable match with a known standard (e.g., DMT, HDTV) is determined, a result identifying or representing the known standard is generated at the software detection module and returned to, for example, a processor of the embedded appliance. Otherwise, if a suitable match is not made, then at 7003, the measurements are used to calculate estimated timings for a set of other known standards including, for example, CVT, CVT-RB, and/or GTF standards. These estimated timings are then tested for validity, and any invalid or illegal combinations are discarded.

Next, valid estimated timings are tested for an estimated match with the set of known standards. If a match with an known standard (e.g., CVT, CVT-RB, GTF) is determined, a result including the known standard is generated at the software detection module and returned to, for example, a processor of the embedded appliance. Otherwise, if no match is determined with any known standard at 7003, then at 7004, a minimal-matching method or process can be applied on the measurements to search for a minimal match based on the measurements. Such a minimal-matching method can be similar to (a portion of) the approach used at 7001-7003, except that one or more of the measured values is removed from the match criteria for the minimal-matching method. In some embodiments, the step of 7004 can be repeated several times using different match criteria. This repeating of 7004 can continue until a match is found, or until no measured value remains to be removed.

In some embodiments, the process illustrated by the flowchart in FIG. 7 can be re-applied to a range of measurement values to define a list of candidate timings. These candidate timings can then be searched for the best match. Stated another way, the method executed at the software detection module can loop through a range of one or more parameters, generating a timing estimate for each of the measurement values in the range. When the loop is complete, a best-fit method can be applied to the results to select the final timing.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

In conclusion, among other things, an apparatus and method for capturing, processing, storing and/or sending media signals using an embedded appliance is described. While various embodiments of the invention have been described above, it should be understood that they have been presented by way of example only and various changes in form and details may be made. For example, processors and/or modules of an embedded appliance can be included on separate electronic boards in one or more housings, can have dedicated memory (RAM etc).

What is claimed is:

1. A non-transitory processor-readable medium storing code representing instructions to be executed by a processor, comprising code to cause the processor to:
   receive, at the processor, a first media signal and a second media signal, for a capture time window;
   identify, at the processor, a first plurality of media signal parameters based on the first media signal;
   calculate, at the processor, a modification associated with a session format having a second plurality of media signal parameters different from the first plurality of media signal parameters, the modification not being predetermined or from a list of predetermined modifications or based on a user selection; and
   modify, at the processor, the first media signal based on the modification to produce a first modified media signal in the session format and having the second plurality of media signal parameters.

2. The non-transitory processor-readable medium of claim 1, wherein the modification is independent of a format of the first media signal and a format of the second media signal.

3. The non-transitory processor-readable medium of claim 1, wherein the first plurality of media signal parameters include at least two of a resolution of the first media signal, a frame rate of the first media signal, a bit rate of the first media signal, or a clock rate of the first media signal.

4. The non-transitory processor-readable medium of claim 1, wherein the first media signal is modified by performing on the first media signal at least one of deinterleaving, decimating, resizing, color space converting, modifying gain, adjusting audio level, or audio multiplexing.

5. The non-transitory processor-readable medium of claim 1, wherein:
   the first media signal is an audio signal,
   the second media signal is at least one of (1) a visual-capture media signal, (2) a video media signal, or (3) a digital-image media signal.

6. The non-transitory processor-readable medium of claim 1, wherein:
   the first media signal is at least one of (1) a visual-capture media signal, (2) a video media signal, or (3) a digital-image media signal; and
   the second media signal is an audio signal.

7. The non-transitory processor-readable medium of claim 1, further comprising code to cause the processor to:
send the first modified media signal and the second media signal such that the first modified media signal and the second media signal are synchronized.

8. The non-transitory processor-readable medium of claim 1, wherein the first session format is an intermediate format for transport to a control server and subsequent processing by the control server into a second session format.

9. A method, comprising:
receiving, at a processor, a first media signal and a second media signal, for a capture time window;
identifying, at the processor, a first plurality of media signal parameters based on the first media signal;
calculating, at the processor, a modification associated with a session format having a second plurality of media signal parameters different from the first plurality of media signal parameters, the modification not being predetermined or from a list of predetermined modifications or based on a user selection; and
modifying, at the processor, the first media signal based on the modification to produce a first modified media signal in the session format and having the second plurality of media signal parameters.

10. The method of claim 9, wherein the modification is independent of a format of the first media signal and a format of the second media signal.

11. The method of claim 9, wherein the first plurality of media signal parameters include at least two of a resolution of the first media signal, a frame rate of the first media signal, a bit rate of the first media signal, or a clock rate of the first media signal.

12. The method of claim 9, wherein the first media signal is modified by performing on the first media signal at least one of deinterleaving, decimating, resizing, color space converting, modifying gain, adjusting audio level, or audio multiplexing.

13. The method of claim 9, wherein:
the first media signal is an audio signal,
the second media signal is at least one of (1) a visual-capture media signal, (2) a video media signal, or (3) a digital-image media signal.

14. The method of claim 9, wherein:
the first media signal is at least one of (1) a visual-capture media signal, (2) a video media signal, or (3) a digital-image media signal; and
the second media signal is an audio signal.

15. The method of claim 9, further comprising:
sending the first modified media signal and the second media signal such that the first modified media signal and the second media signal are synchronized.

16. A non-transitory processor-readable medium storing code representing instructions to be executed by a processor, comprising code to cause the processor to:
receive, at the processor, a first media signal and a second media signal;
identify, at the processor, a media signal parameter from a first plurality of media signal parameters based on the first media signal, the first plurality of media signals being associated with the first media signal and a first session format;
calculate, at the processor, a modification associated with a second session format having a second plurality of media signal parameters different from the first plurality of media signal parameters, the modification not being predetermined or from a list of predetermined modifications or based on a user selection; and
modify, at the processor, the first media signal based on the modification to produce a first modified media signal in the second session format and having the second plurality of media signal parameters.

17. The non-transitory processor-readable medium of claim 16, wherein the modification is independent of the first session format and the second session format.

18. The non-transitory processor-readable medium of claim 16, wherein the modification is independent of a type of media capture device from which the first media signal is received.

19. The non-transitory processor-readable medium of claim 16, wherein:
the first media signal is an audio signal,
the second media signal is at least one of (1) a visual-capture media signal, (2) a video media signal, or (3) a digital-image media signal.

20. The non-transitory processor-readable medium of claim 16, wherein:
the first media signal is at least one of (1) a visual-capture media signal, (2) a video media signal, or (3) a digital-image media signal; and
the second media signal is an audio signal.

21. The non-transitory processor-readable medium of claim 16, the code further comprising code to cause the processor to:
send the first modified media signal and the second media signal such that the first modified media signal and the second media signal are synchronized.

* * * * *